US012574164B2

(12) United States Patent
     Elshafie et al.

(10) Patent No.:     US 12,574,164 B2
(45) Date of Patent:        Mar. 10, 2026

(54) HYBRID AUTOMATIC REPEAT REQUEST ACKNOWLEDGEMENT (HARQ-ACK) TIMEOUT FOR ACTIVATING HARQ-LESS FEEDBACK

(71) Applicant: QUALCOMM Incorporated, San Diego, CA (US)

(72) Inventors: Ahmed Elshafie, San Diego, CA (US); Yi Huang, San Diego, CA (US); Konstantinos Dimou, New York, NY (US); Jing Sun, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 18/253,004

(22) PCT Filed: Jan. 24, 2022

(86) PCT No.: PCT/US2022/013559
     § 371 (c)(1),
     (2) Date: May 15, 2023

(87) PCT Pub. No.: WO2022/159836
     PCT Pub. Date: Jul. 28, 2022

(65)           Prior Publication Data
     US 2024/0014947 A1       Jan. 11, 2024

(30)        Foreign Application Priority Data

Jan. 25, 2021    (GR) ............................... 20210100045

(51) Int. Cl.
     *H04L 1/1829*          (2023.01)
     *H04L 1/1867*          (2023.01)

(52) U.S. Cl.
     CPC .......... *H04L 1/1848* (2013.01); *H04L 1/1854* (2013.01); *H04L 1/1864* (2013.01); *H04L 1/188* (2013.01); *H04L 1/1896* (2013.01)

(58) Field of Classification Search
     None
     See application file for complete search history.

(56)                References Cited

U.S. PATENT DOCUMENTS

2019/0313380 A1*   10/2019   Ye ............................ H04L 1/188
     2021/0410174 A1*   12/2021   Lin ........................ H04L 1/1896
                        (Continued)

FOREIGN PATENT DOCUMENTS

EP            3930396 A1     12/2021
     WO        2017052345 A1      3/2017
     WO        2020199128 A1     10/2020

OTHER PUBLICATIONS

International Search Report and Written Opinion—PCT/US2022/013559—ISA/EPO—May 3, 2022.
                        (Continued)

*Primary Examiner* — Saumit Shah
(74) *Attorney, Agent, or Firm* — Loza & Loza, LLP

(57)                ABSTRACT

Aspects relate to feedback such as HARQ-ACK/NACK feedback in wireless communication systems. A predetermined condition, such as a timeout condition, is configured for a user equipment (UE) to determine whether a HARQ-less feedback should be implemented in the UE. In a particular aspect, the predetermined condition may be a timeout period or some other condition where a UE will cancel or discard feedback if the UE is unable to respond within the timeout period or meet the condition imposed. Various conditions may be imposed and are communicated
                        (Continued)

1400 through either radio resource control (RRC) signaling or downlink control information (DCI) parameters, or a combination thereof.

28 Claims, 16 Drawing Sheets

(56)                    References Cited

U.S. PATENT DOCUMENTS

| | | | | |
|---|---|---|---|---|
| 2023/0047645 | A1* | 2/2023 | Gou | H04L 5/0064 |
| 2023/0336315 | A1* | 10/2023 | Yin | H04L 1/1854 |
| 2024/0008123 | A1* | 1/2024 | Ying | H04L 5/0055 |
| 2024/0340107 | A1* | 10/2024 | Alfarhan | H04L 1/1685 |

OTHER PUBLICATIONS

OPPO: "UCI Enhancements for URLLC", 3GPP TSG RAN WG1 #98bis, 3GPP Draft, R1-1910620, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 6 Pages, Oct. 5, 2019 (Oct. 5, 2019), XP051808608.

* cited by examiner

1400

Start

Receive a physical downlink shared channel (PDSCH) transmission from a network entity ~1402

Determine when to transmit an acknowledgement (ACK) or negative acknowledgement (NACK) feedback transmission to the network entity in response to the PDSCH transmission based on at least a predetermined condition configured by the network entity ~1404

End

1600

HYBRID AUTOMATIC REPEAT REQUEST ACKNOWLEDGEMENT (HARQ-ACK) TIMEOUT FOR ACTIVATING HARQ-LESS FEEDBACK

CROSS-REFERENCE TO RELATED APPLICATION(S)

This application claims priority to and the benefit of International Patent Application No. PCT/US2022/13559 filed 24 Jan. 2022, which claims priority to Greek Application Serial No. 20210100045 filed in the Greece Patent Office on Jan. 25, 2021, the entire contents of which are incorporated herein by reference as if fully set forth below in their entireties and for all applicable purposes.

TECHNICAL FIELD

The technology discussed below relates generally to wireless communication systems, and more particularly, to configuring and communicating a hybrid automatic repeat request acknowledgement (HARQ-ACK) timeout for activating a HARQ-less feedback operation.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UE). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission and reception points (TRPs), etc.) in communication with a number of central units (CUs) (e.g., central nodes (CNs), access node controllers (ANCs), etc.), where a set of one or more DUs, in communication with a central unit (CU), may define an access node (e.g., which may be referred to as a BS, 5G NB, next generation NodeB (gNB or gNodeB), transmission and reception point (TRP), etc.). A BS or distributed unit (DU) may communicate with a set of UEs on downlink channels (e.g., for transmissions from a BS or DU to a UE) and uplink channels (e.g., for transmissions from a UE to BS or DU).

In particular aspects of wireless systems, a scheduling process is used for allocating wireless resources (e.g., time/ frequency resources) for transmitting data. In 5G NR systems, for example, scheduling of UEs may be determined by the wireless network (e.g., scheduling through signaling from a BS or gNB that is part of the network). Furthermore, wireless systems such as 5G NR systems may employ two types of scheduling: dynamic scheduling, and semi persistent scheduling (SPS). Dynamic scheduling is a mechanism in which each physical channel (e.g., a physical downlink shared channel (PDSCH)) is scheduled by downlink control information (DCI) from the network. SPS, on the other hand, is a mechanism wherein transmissions are scheduled by radio resource control (RRC) messaging from the network to a UE and DCI is utilized to activate or deactivate the SPS. As part of the scheduling process, a UE is also configured to feedback either an acknowledgement (ACK) or negative acknowledgement (NACK) feedback (e.g., HARQ-ACK/ NACK) in response to receipt of the scheduled PDSCH.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one aspect, a method for wireless communication by a user equipment (UE) is disclosed. The method includes receiving a physical downlink shared channel (PDSCH) transmission from a network entity. Further, the method includes determining whether to transmit an acknowledgement (ACK) or negative acknowledgement (NACK) feedback transmission (ACK/NACK feedback transmission) to the network entity in response to the PDSCH transmission based on at least a predetermined condition configured by the network entity.

According to another aspect, a user equipment (UE) for wireless communication in a wireless communication network is disclosed. The UE includes a wireless transceiver, a memory, and a processor communicatively coupled to the wireless transceiver and the memory. The processor and the memory are configured to receive a physical downlink shared channel (PDSCH) transmission from a network entity. Further, the processor and memory are configured to determine whether to transmit an acknowledgement (ACK) or negative acknowledgement (NACK) feedback transmission (ACK/NACK feedback transmission) to the network entity in response to the PDSCH transmission based on at least a predetermined condition configured by the network entity.

According to yet another aspect, a method for wireless communication by a network entity, such as a gNB, is disclosed. The method includes sending configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications. Additionally, the method includes sending a PDSCH transmission to the UE, and receiving ACK/NACK feedback from the UE responsive to the PDSCH when the UE determines to transmit the ACK/NACK feedback based on the predetermined condition. In other aspects, the lack a receipt of feedback from the UE may be expected at the network entity in the case of a HARQ-less feedback being affirmatively implemented by the network entity.

According to yet one more aspect, a network entity for wireless communication in a wireless communication network is disclosed. The network entity includes a wireless transceiver, a memory, and a processor communicatively coupled to the wireless transceiver and the memory. The processor and the memory are configured to send configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications. Further, the processor and the memory are configured to send a PDSCH transmission to the UE, and receive ACK/NACK feedback from the UE responsive to the PDSCH when the UE determines to transmit the ACK/NACK feedback based on the predetermined condition.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
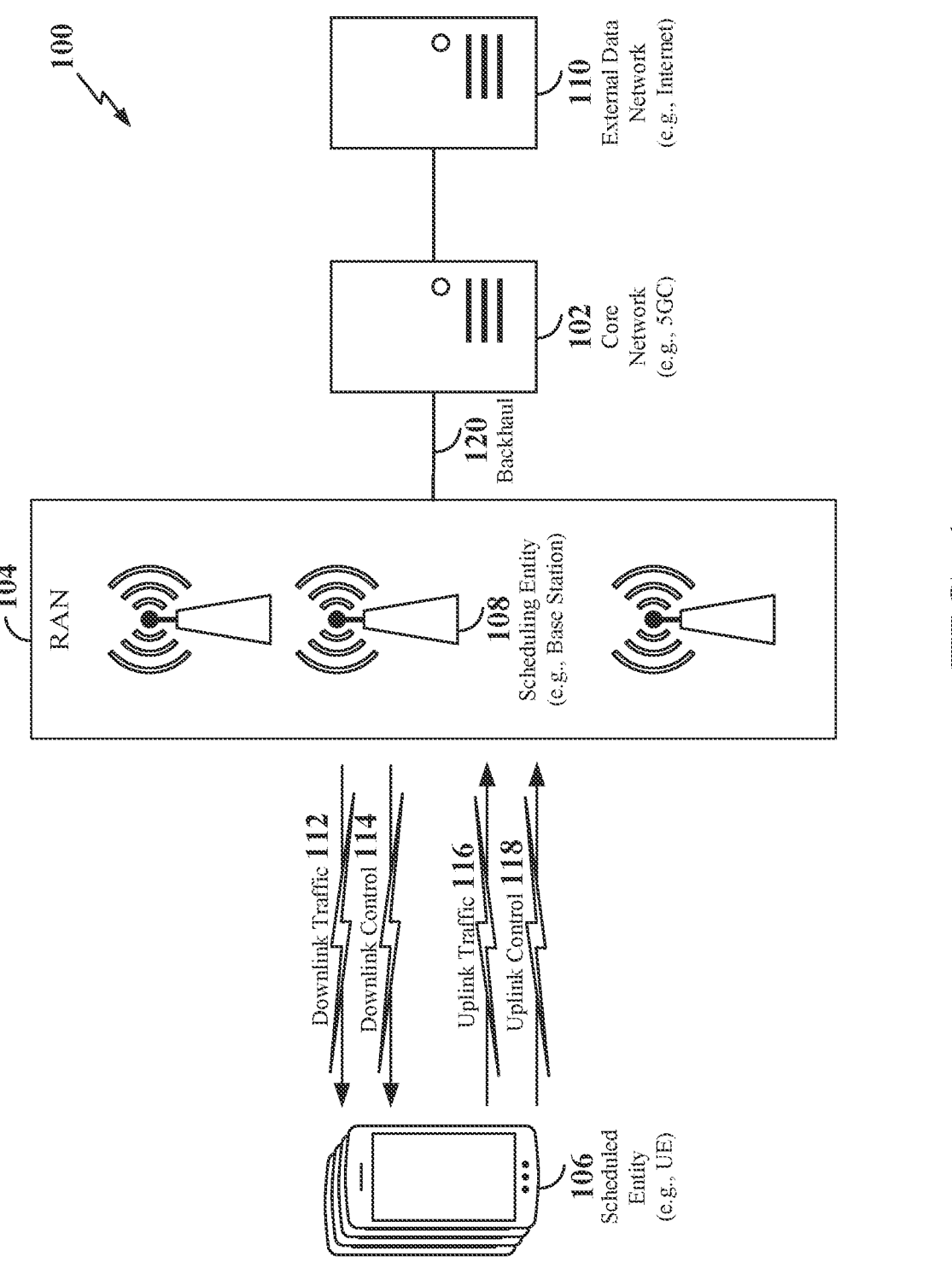
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Aspects described in this application relate to feedback in dynamic grant and semi persistent scheduling scenarios where feedback (e.g., HARQ-ACK/NACK) is sent in response to a PDSCH transmission. In particular, aspects relate to a UE determining a HARQ-less feedback scenario where a decision of whether to transmit an acknowledgement (ACK) or negative acknowledgement (NACK) feedback transmission (ACK/NACK feedback transmission) to a network entity in response to the PDSCH transmission is based on at least a predetermined condition configured by the network entity. In a particular aspect, the predetermined condition is a timeout period or time (or conditions related to time) where a UE will cancel or discard feedback if the UE is unable to respond within the timeout period.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency chains (RF-chains), power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108 (e.g., a RAN entity, RAN node, or the like). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency chains (RF chains), amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, etc.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmissions. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexing (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
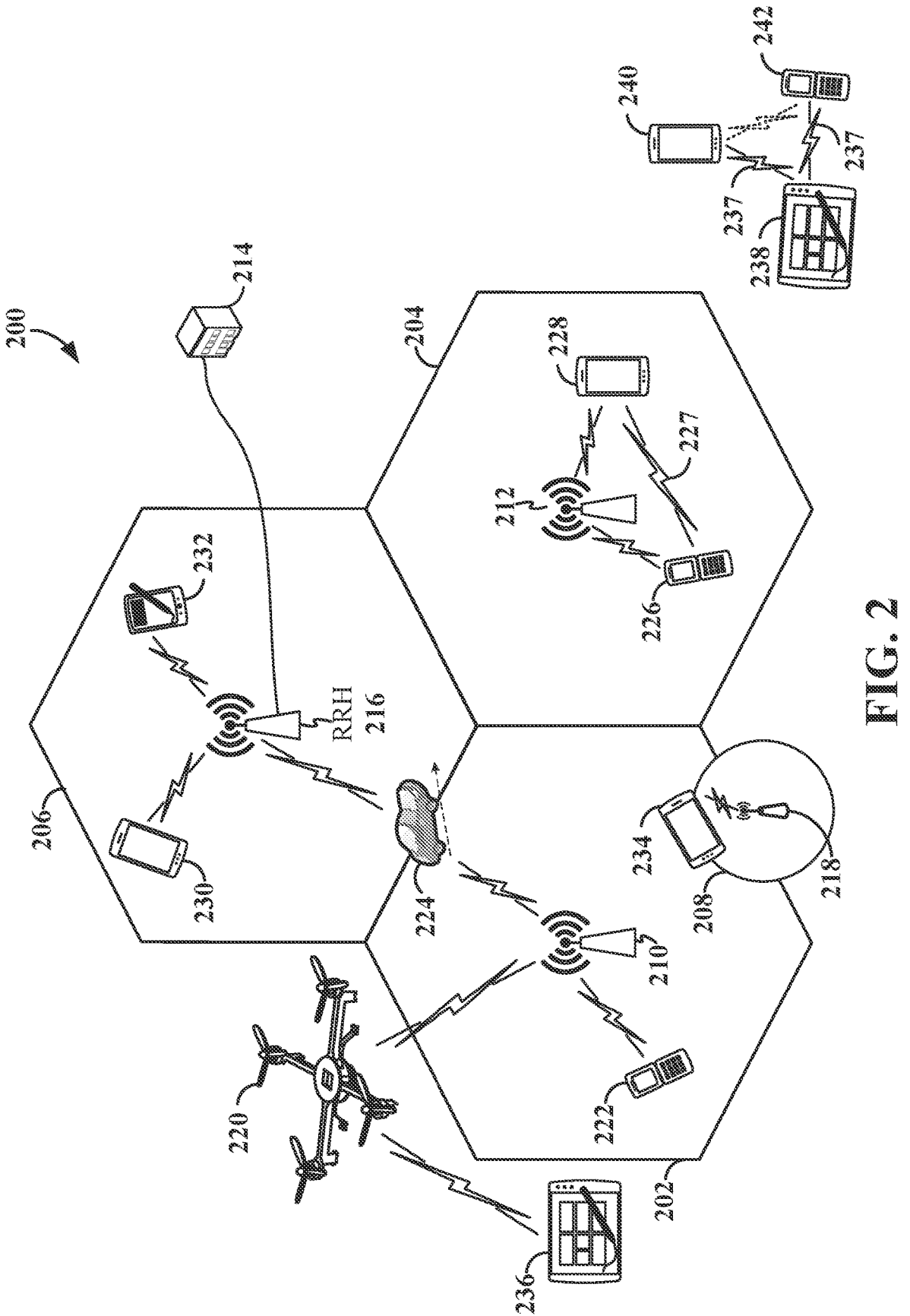
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIGS. 1 and/or 2) for all the UEs in the respective cells. For example, UEs 222 and 224 may be in communication with base station 210; UEs 226 and 228 may be in communication with base station 412; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Base stations 210, 212, 214, 218 may operate as scheduling entities, scheduling resources for communication among the UEs within their service areas or cells 202, 204, 206, 208, respectively. However, base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 246. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an access and mobility function (AMF).

A RAN 200 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
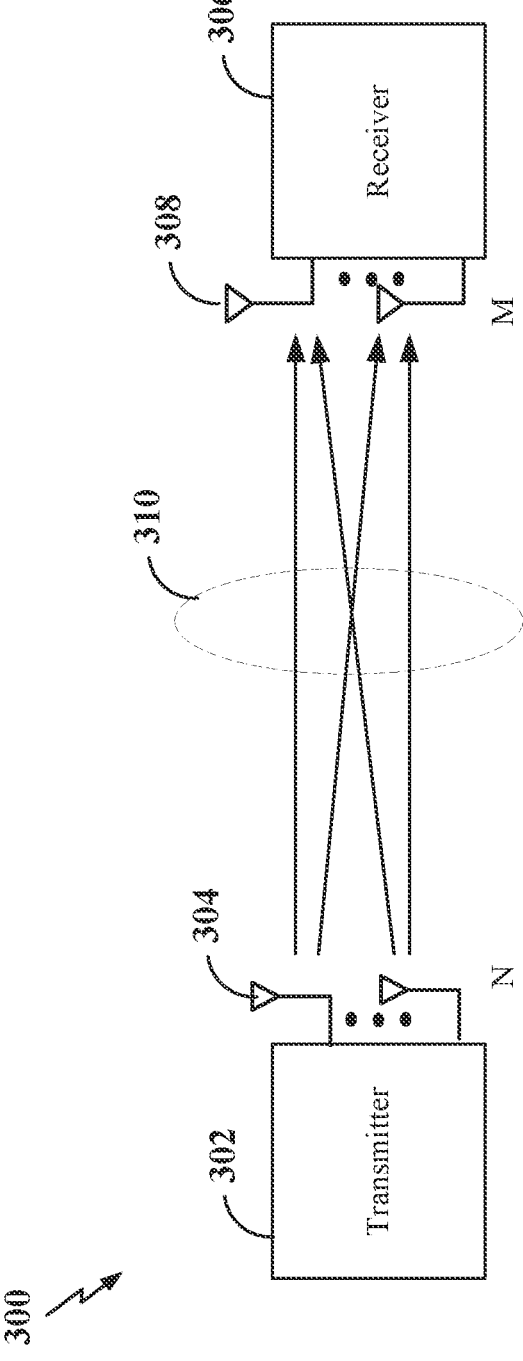
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precod-ing each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and rank indicator (RI) values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306. A beam may be formed by, but not limited to, an antenna, an antenna port, an antenna element, a group of antennas, a group of antenna ports or a group of antenna elements. The beam may be alternatively made with a certain reference signal resource. The beam may be equivalent to a spatial domain filtering by which an electromagnetic radiation is transmitted.

In 5G New Radio (NR) systems, particularly for mmWave systems, beamformed signals may be utilized for most downlink channels, including a physical downlink control channel (PDCCH) and a physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

Various aspects of the present disclosure will be described with reference to an OFDM waveform, schematically illustrated in FIG. 4. It should be understood by those of ordinary skill in the art that the various aspects of the present disclosure may be applied to a single-carrier FDMA (SC-FDMA) waveform in substantially the same way as described herein below. That is, while some examples of the present disclosure may focus on an OFDM link for clarity, it should be understood that the same principles may be applied as well to SC-FDMA waveforms.

Figure 4:
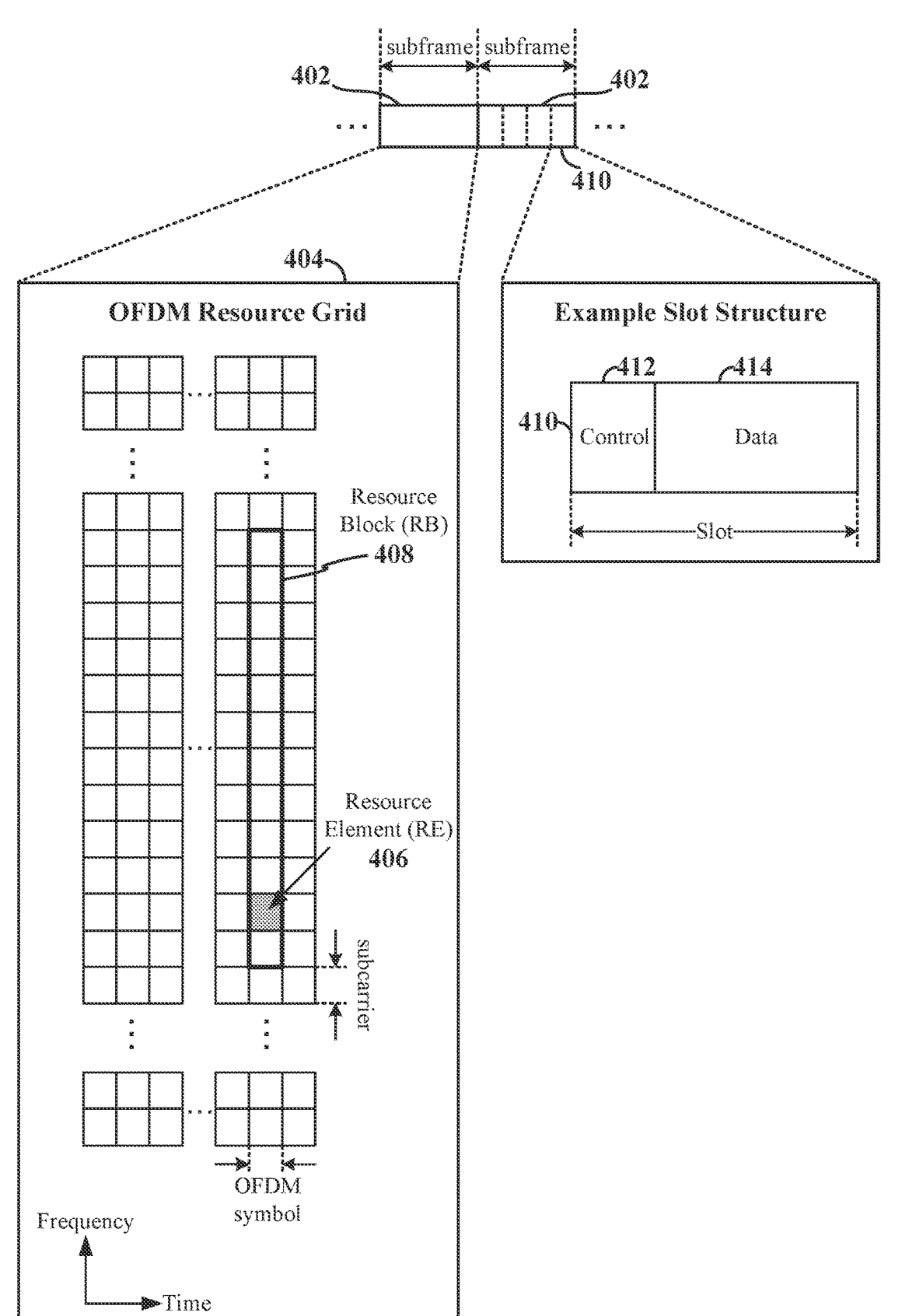
FIG. 4 is a schematic illustration of an organization of wireless resources in an air interface utilizing orthogonal frequency division multiplexing (OFDM) according to some aspects.

Referring now to FIG. 4, an expanded view of an exemplary subframe 402 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs (e.g., scheduled entities) for downlink or uplink transmissions typically involves scheduling one or more resource elements 406 within one or more sub-bands. Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 508 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry uplink control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
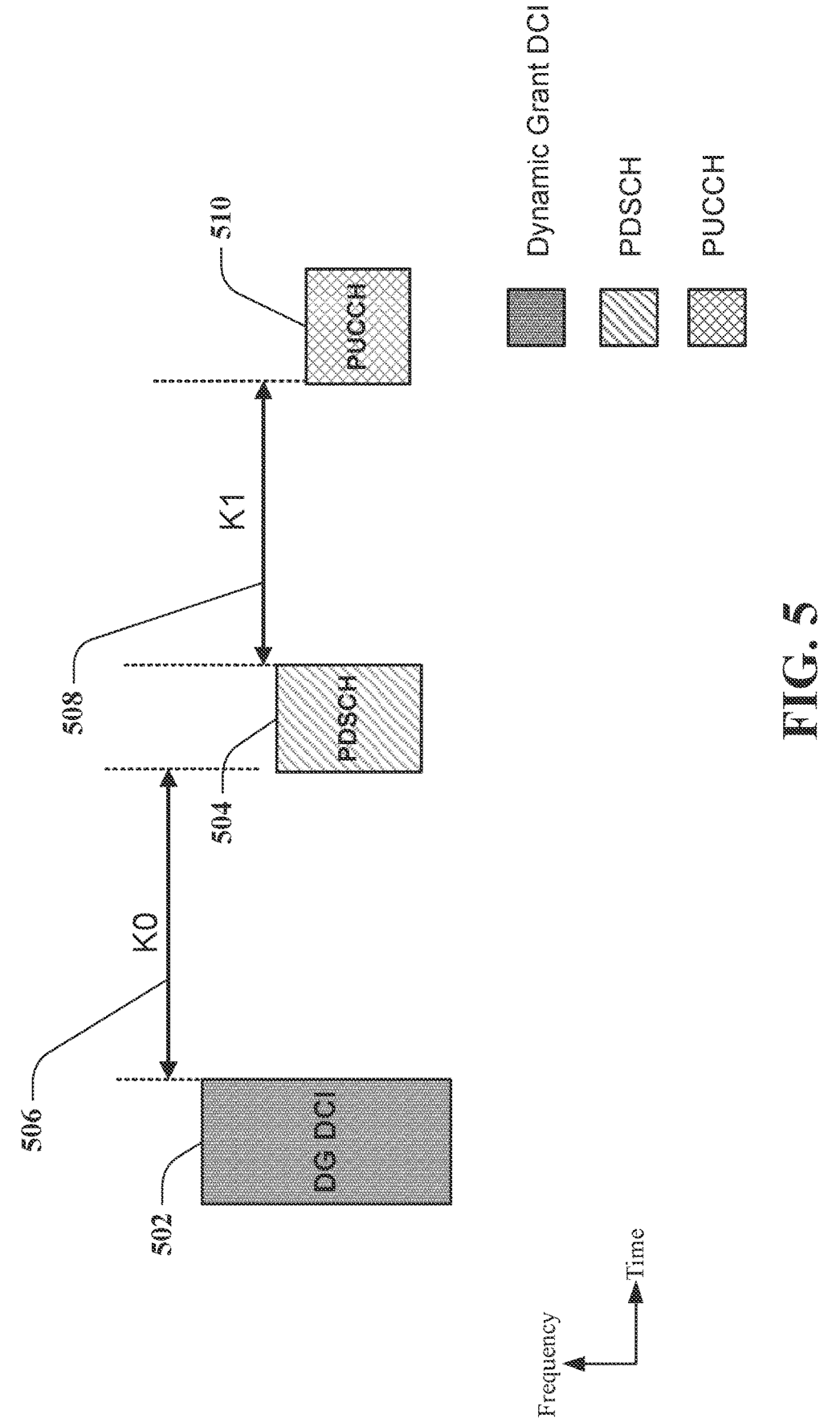
FIG. 5 is a diagram illustrating an example of dynamic scheduling of communications according to some aspects.

Concerning scheduling in wireless systems, FIG. 5 illustrates an example of dynamic scheduling in a wireless communication system according to some aspects. In this example, a network entity such as a BS or gNB may be used to effectuate scheduling for a UE in the system.

In the example of FIG. 5 illustrating dynamic scheduling (which may interchangeably be referred to herein as dynamic grant (DG)), when data is to be transmitted by a network entity such as a gNB (e.g., 104/108 in FIG. 1 or BSs 210, 212 or RRH 216 in FIG. 2) to a UE (e.g., UE 106 in FIG. 1 or UEs 222, 226, 228, 230, etc. in FIG. 2), the network entity may transmit a dynamic grant DCI 502 on the downlink (DL) to a UE for scheduling wireless resources. The DCI 502 includes information to configure a dynamic grant PDSCH 504 for the UE. In a particular aspect, a time offset K0 (also designated with reference number 506 in FIG. 5), which is set according to the dynamic scheduling by the network entity, is included within the DCI 502 to inform the UE of the time offset K0 from the DCI 502 to transmission of the PDSCH 504. As shown, the network entity then transmits PDSCH 504 with data to the UE after the time offset K0. It is noted that this time offset K0 can also be thought of as the time at which the UE will expect a PDSCH transmission of data. In certain aspects, rather than defined in terms of time units, the time offset K0 may be defined in terms of a number of time slots.

In response to receiving the PDSCH 504, a UE will send uplink control information (UCI) (e.g., HARQ feedback) on the UL to the network entity via a PUCCH 508 after a second time offset K1 (also designated with reference number 510 in FIG. 5). This feedback (e.g., 510) may be configured as either a HARQ-ACK if the PDSCH data is received and decoded or a HARQ-NACK if the PDSCH data is not received and/or is not able to be decoded by the UE. In certain aspects, the time offset K1 is set by the network and communicated through the dynamic grant in DCI 502. In other aspects, the time offset K1 may be defined in terms of a number of time slots. In still further aspects, it is noted that the time offset K1 is a DCI parameter defining the time between the PDSCH (e.g., 504) and the sending of the feedback (e.g. 510) as shown in FIG. 5. In yet other aspects, the information in the example of FIG. 5 may be transmitted according to time division duplex (TDD), wherein portions of time (e.g., slots) are allocated for downlink-centric slots, downlink-only slots, uplink-centric slots, and/or uplink-only slots, as an example.

Figure 6:
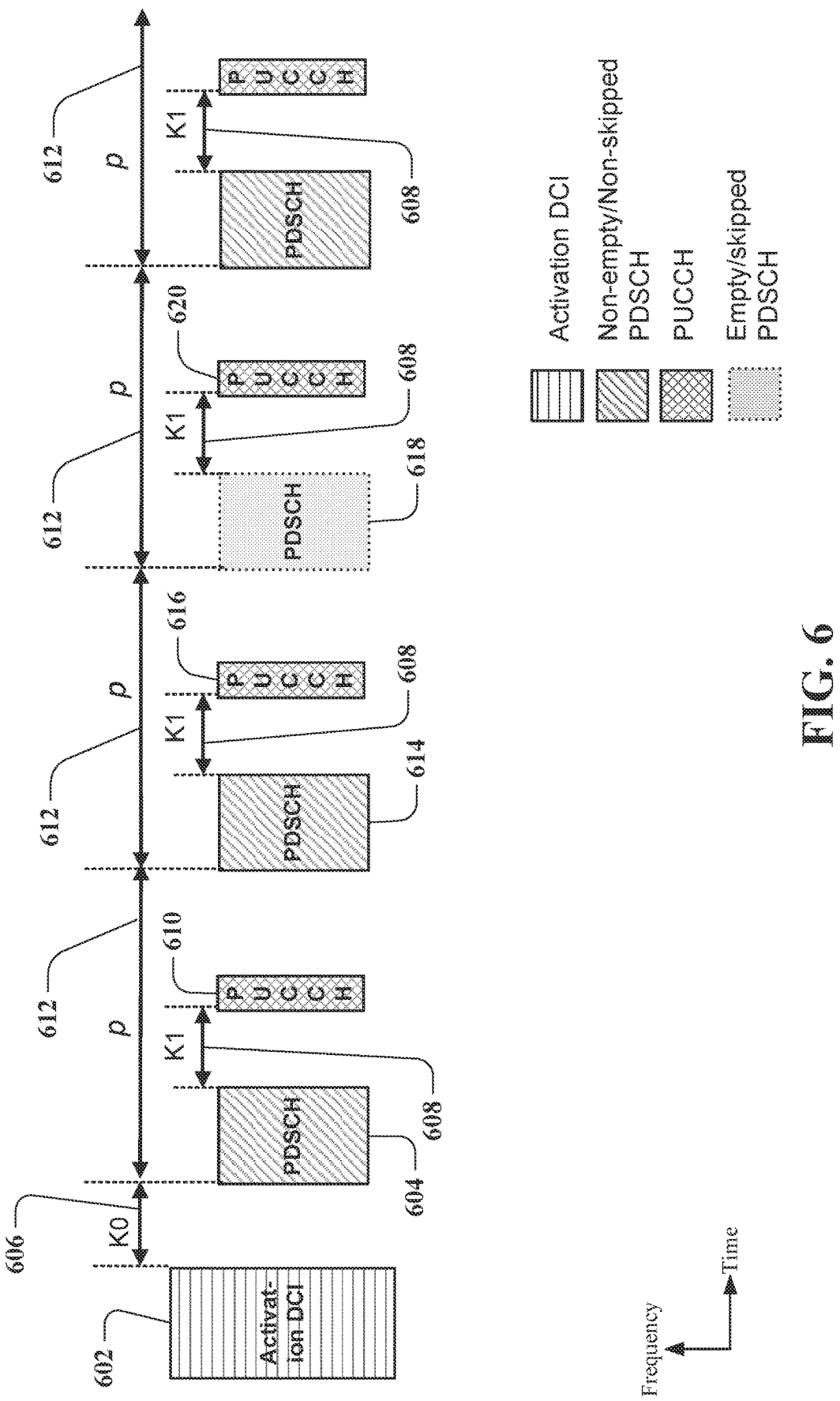
FIG. 6 is a diagram illustrating illustrates an example of signaling between a network entity and a UE using semi persistent scheduling (SPS) communication according to some aspects.

Another example of scheduling in wireless systems is semi persistent scheduling (SPS). FIG. 6 illustrates an example of signaling between a network entity and a UE using SPS communication. In an aspect, it noted that the PDSCH configuration for SPS is configured with a periodicity p, which defines the time between two PDSCH occasions. Further, a time offset parameter K1 specifies the PUCCH grant time in a number of time slots that the UE is expected to send UCI (e.g., feedback HARQ-ACK/NACK) after receiving the PDSCH.

As a visual example, FIG. 6 shows an activation DCI 602 that is transmitted by a network entity, such as a gNB, which serves to activate or start SPS. Similar to dynamic scheduling discussed before, the DCI 602 may include time offset information K0, which schedules the time at which the DL PDSCH 604 will be transmitted after the activation DCI 602 transmission (which can also be thought of as the time at which the UE will expect a PDSCH transmission of data). Additionally, because this is SPS operation, the periodicity p between each PDSCH transmission is predefined (and which may be RRC signal configured in the UE by the network, whereas the K0 offset time is configured in the DCI). Accordingly, after activation, the UE will expect to potentially receive a PDSCH after each p time period, which may further be defined in terms of slots. This cycle may be disrupted or halted by deactivation or release DCI's or changed through reactivation DCIs, as will be discussed later.

In the example of FIG. 6, after activation DCI 602 is transmitted, a first PDSCH 604 is transmitted after the K0 offset time (also indicated by reference number 606). The UE, in turn, will transmit UCI (e.g., HARQ-ACK/NACK) in a PUCCH 610 that is scheduled after a time offset K1 (also indicated by reference number 608) after the PDSCH transmission. After a period time p (also indicated by reference number 612) from the transmission of the PDSCH 604, a next PDSCH 614 is transmitted on the DL, and the UE responds with a PUCCH 616 transmission after the K1 608 time offset.

FIG. 6 further illustrates an instance where there may be no data transmitted at a scheduled p time of a PDSCH transmission. In this case, an empty or skipped PDSCH 618 (which is dashed to indicate either a PDSCH with no data therein is transmitted or that no PDSCH is actually transmitted at this time). Furthermore, as there is not PDSCH data, it is not necessary for transmission of feedback in PUCCH 620, for example.

Figure 7:
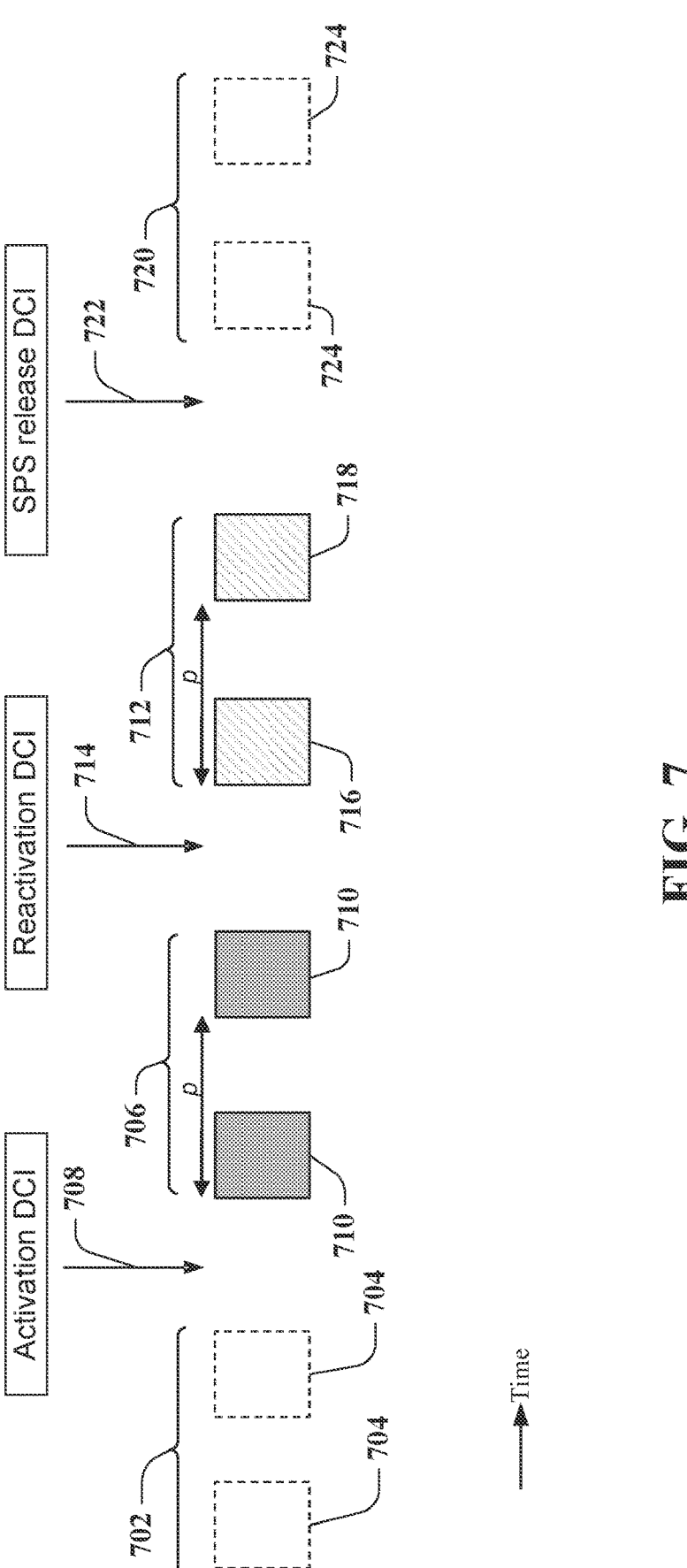
FIG. 7 is a diagram illustrating a timeline diagram showing various operations/scenarios that may occur during SPS communications according to some aspects.

FIG. 7 further illustrates a timeline diagram showing various operations/scenarios that may occur during SPS communications. In a first instance at 702, a UE will not monitor SPS transmission locations for PDSCH (shown at 704) because the SPS configuration is not yet active (e.g., no activation DCI has been sent by the network).

At a second instance at 706, it is assumed that an activation DCI has been transmitted at some time as indicated at 708 to start SPS. At this point, a UE will start to monitor the PDSCH transmitted at the configured time offset K0 (i.e., for the first PDSCH at the start of SPS) and/or after each p period thereafter in accordance with the predetermined SPS configuration, which may be RRC configured. The PDSCH are shown generally by blocks 710, and the number is not limited to two as shown, but may be any of a various number of PDSCHs transmitted at the p periodicity. Additionally, the UE will transmit UCI (e.g., HARQ-ACK) after the K1 time period determined according to the predetermined SPS configuration, which is also RRC configured.

At a third instance shown at 712, it is assumed that a reactivation DCI has been transmitted at some time as indicated at 714 to reactivate SPS. It is noted that a "reactivation" DCI may be used by a network entity to change the information or Tx parameters discussed above such as MCS, RB allocation, and antenna ports of the SPS transmission. The UE then subsequently starts to monitor the next PDSCH 716 and subsequent PDSCHs (e.g., 718) following the new parameters indicated in the reactivation DCI. The PDSCH are shown generally here, and the number is not limited to two as shown, but may be any of a various number of PDSCHs transmitted at the p periodicity.

At a fourth instance shown at 702, it is assumed that an SPS release DCI has been transmitted by the network at some time as indicated by 722. In this instance, the network (e.g., a gNB) use the SPS release DCI to deactivate a configured SPS. Accordingly, the scheduled PDSCHs (e.g., 724) for the SPS configuration are not monitored by the UE.

Figure 8:
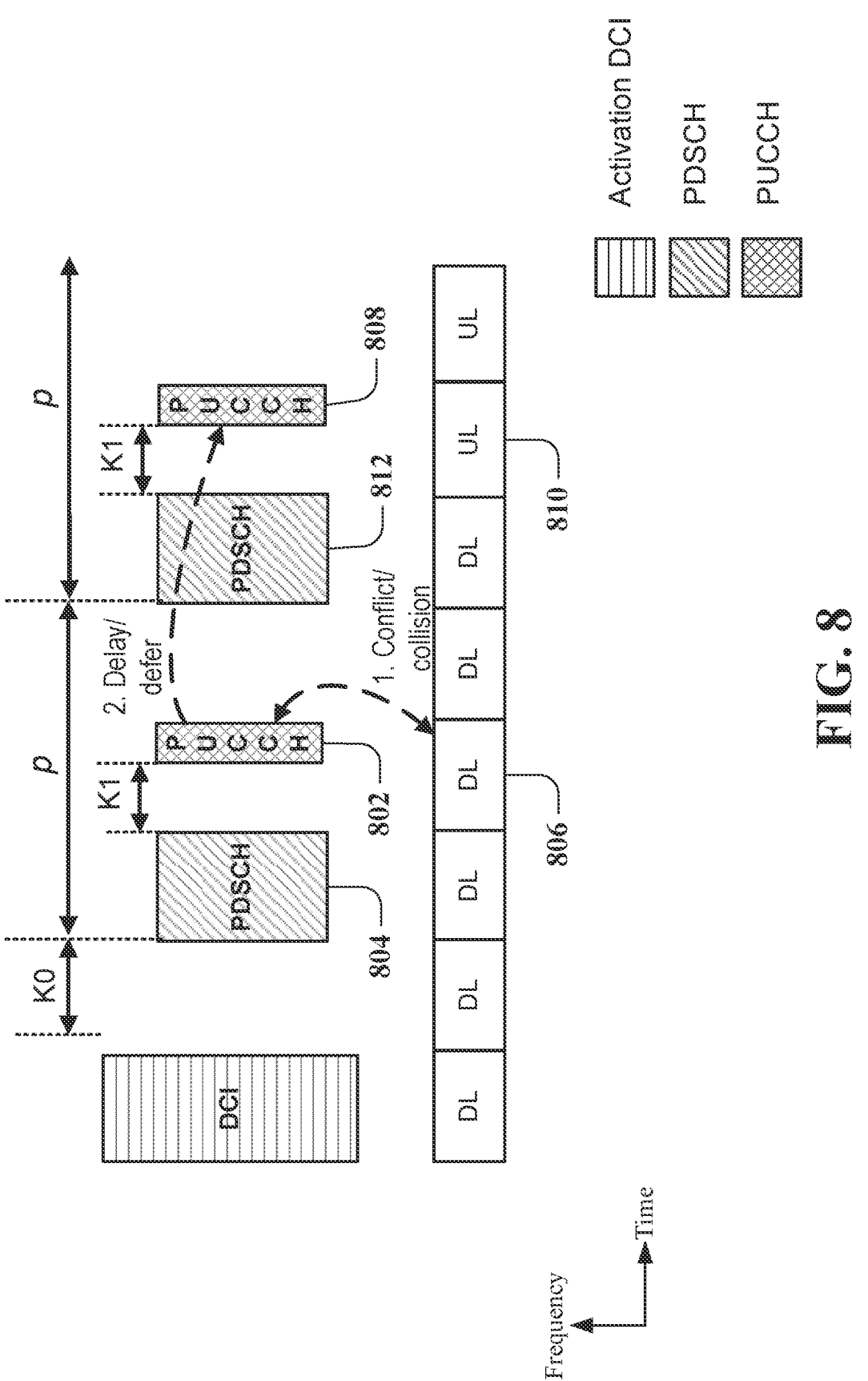
FIG. 8 is a diagram illustrating an example of a SPS communication performed with time division duplex (TDD) according to some aspects.

In yet other aspects of SPS, FIG. 8 illustrates an example of a scenario where, when communication is performed using time division duplex (TDD), higher loading of a PUCCH sending HARQ-ACK/NACK feedback may result due to deferral of one or more colliding PUCCH transmissions. In this scenario, the transmission of am SPS scheduled PUCCH 802 that is configured to include feedback responsive to a received PDSCH 804 may conflict or collide with a scheduled downlink (DL) slot, subslot, or symbol, which is shown at 806. In this case, the feedback transmission may be deferred or delayed for transmission in the next available scheduled PUCCH resources that do not conflict with a DL slot, subslot, or symbol (i.e., are scheduled during an uplink (UL) slot, subslot, or symbol in the TDD configuration). As an example, FIG. 8 shows that subsequent PUCCH resources 808 are scheduled during an UL slot, subslot, or symbol 810, so no conflict or collision would occur. In this case, the feedback that should have been sent at PUCCH 802 are included in the PUCCH 808 along with feedback responsive to PDSCH 812, for example, such as through multiplexing of the feedback information. This inclusion of the deferred feedback data increases the payload size of the PUCCH 808.

Figure 9:
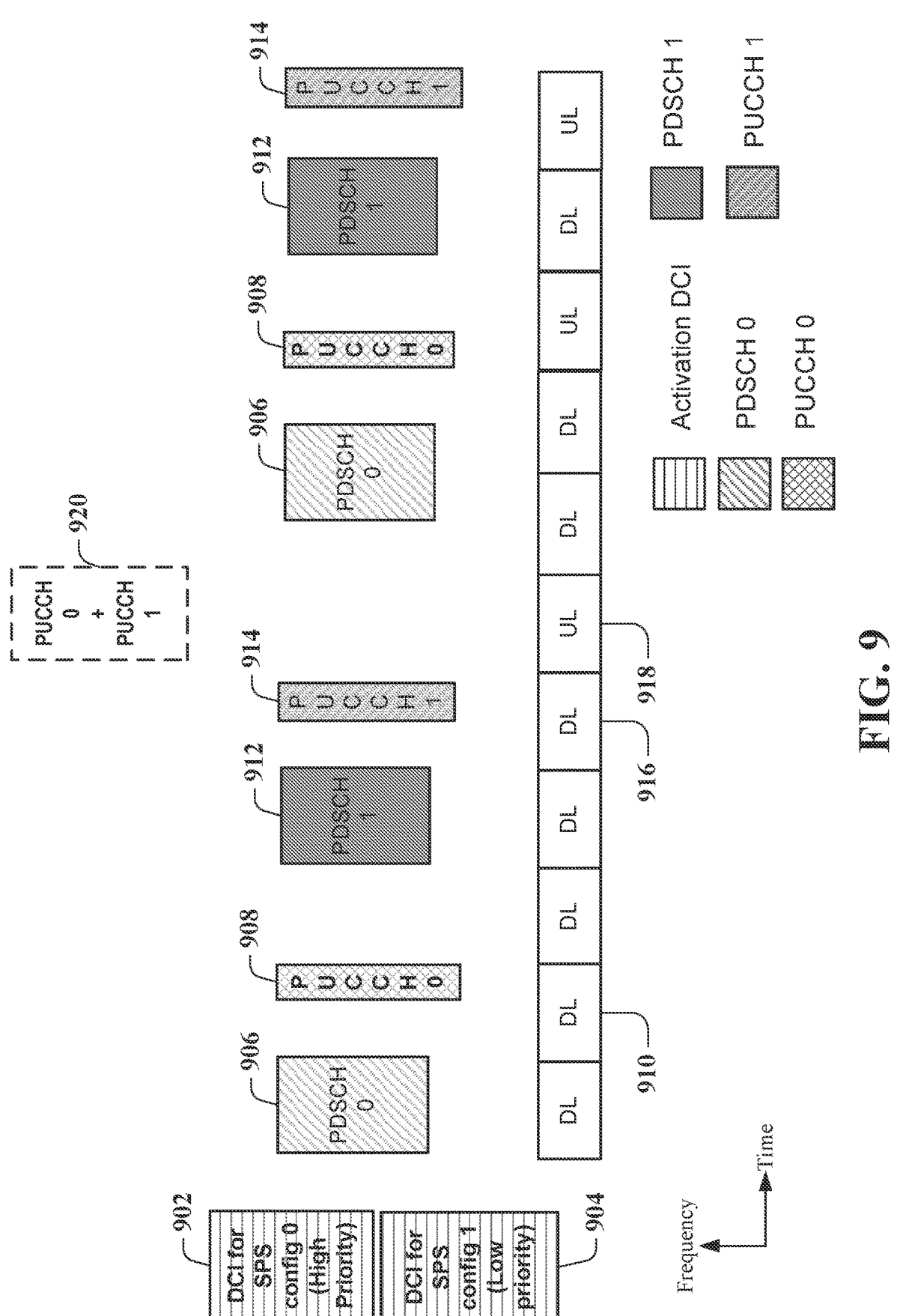
FIG. 9 illustrates an example of SPS where multiple SPS configurations are utilized according to some aspects.

FIG. 9 illustrates yet another example of SPS where multiple SPS configurations are utilized. In this example, the two different SPS configurations also are shown as having different respective priorities, such as a first SPS configuration for ultra-reliable low latency communications (URLLC) and the second SPS configuration for eMBB communications where URLLC communications are higher priority. It is noted for other aspects, however, that the multiple SPS may have the same priority. Additionally, the example of FIG. 9 is assumed to be in a TDD environment where slots/subslots/symbols are designated for either DL or UL communications.

As shown in FIG. 9, activation DCI 902 and 904 may be transmitted by a network entity to activate respective SPS configurations: SPS configuration 0 and SPS configuration 1. Also, it is noted that while two distinct DCI are illustrated, the activation of both configurations could be in a single DCI as well. In this example, SPS configuration 0 is assumed to be for higher priority communications such as URLLC, and SPS configuration 1 is assumed to be for lower priority communications such as eMBB. The SPS configurations correspond to respective scheduled resources in time and frequency.

In this example a PDSCH 0 906 for the first SPS configuration 0 is transmitted. The corresponding scheduled PUCCH 0 908, however, conflicts with a DL slot, subslot, or symbol 910. Accordingly, feedback (e.g., HARQ-ACK/NACK feedback) may be deferred until an UL slot, subslot, or symbol occurs. Additionally, a PDSCH 1 912 for the second, lower priority SPS configuration 1 is transmitted. The corresponding scheduled PUCCH 1 914, however, also conflicts with a DL slot, subslot, or symbol 916, and the feedback data to be sent therein may also be deferred. It is noted, however, that in some systems, the feedback data that was to be sent in PUCCH 1 914 may be canceled, as this is lower priority communication, in favor of the feedback data for the higher priority communication, which may be sent in the first available UL slot, subslot, or symbol 918. In another example, if the SPS configurations 0 and 1 in FIG. 9 have equal priority, the feedback data may be multiplexed into the same PUCCH as shown at 920.

Of further note, in any of the examples illustrated in FIGS. 5-9, the network entity (e.g., gNB) may be configured with a short or tight timing configuration where a next transmission occurs in short time succession after a PDSCH transmission (e.g., the SPS configuration or application may have certain delay requirements). In such cases, it is noted that in the case of HARQ-NACK feedback, for example, the network entity does not time resources available to retransmit the PDSCH that was non-acknowledged. Accordingly, in such cases the HARQ-ACK feedback becomes useless.

In light of the above examples of dynamic scheduling and SPS, it is noted that it may be beneficial to reduce the payload size of HARQ-ACK feedback in the PUCCH for either DG or SPS scheduling configurations. The reduction in the payload size of HARQ-ACK feedback helps to reduce the UE power consumption, as well as to reduce potential interference between UEs, especially in cases where two or more different SPS configuration are being simultaneously utilized (e.g., a high priority SPS configuration such as in the case of URLLC communications and a lower priority SPS configuration such as in the case of eMBB).

In order to reduce the payload size of the HARQ-ACK feedback, some configurations may allow for sending no HARQ-ACK feedback (i.e., "HARQ-less" feedback), such as in cases when the HARQ-ACK packet is expired or timed out. For example, each SPS configuration or application may have a certain delay requirement. In this case, if the delay requirement limit is very small (i.e., "tight") after the first transmit, there might be no way to deliver the HARQ-ACK before the delay limit, hence, the HARQ-ACK is useless. In these cases of timeout, if the UE is enabled with a method or means to communicate the timeout of the HARQ-ACK to the network (i.e., a HARQ-less feedback), further payload reduction of the HARQ-ACK/NACK feedback may be engendered. In aspects, it is noted that this "timeout" may be defined as the time after the PDSCH in which, if UE is not able to deliver the feedback (e.g., HARQ-ACK/NACK), the UE will cancel, abort, or discard the sending of the feedback as part of the configuration. Thus, for example, for each SPS configuration the timeout could be a value of a number of symbols, slots, subslots (e.g., a 4 slot timeout). Additionally, in the instance where a group SPS configurations, the timeout could be defined for a group of configurations.

In order to effect the above HARQ-less feedback, a timer or timing function may be included in the UE that is configured to track or measure the timeout or expiration of the time between the reception of the PDSCH from the network and the point when the HARQ-ACK expires after receiving the PDSCH (i.e., when no HARQ-ACK is sent by UE as the UE is not able to deliver the feedback in enough time). It is noted that this configuration with a timer may implemented in the case of SPS, wherein RRC signaling may be used to configure the SPS configuration to adjust the delay requirements, which may correspond to the timer value (i.e., some timer value X for which (or a number of multiples thereof in other examples, which is not necessarily an integer but may also be a fraction)). The UE is then configured to cancel or drop the PUCCH scheduled HARQ-ACK/NACK feedback, for example, if the UE cannot send feedback within the time set for the timer. It is noted that because the PUCCH feedback is canceled, there is no deferral to a later PUCCH, thereby providing minimization of the PUCCH resource payload, which can become considerable if multiple HARQ-ACK/NACK feedback are deferred.

Additionally, it is noted that when an SPS scheduled HARQ-ACK/NACK collides with the DL transmission and the SPS HARQ-ACK/NACK deferral is not configured, then the SPS HARQ-ACK/NACK bits will be dropped. Furthermore, in the case where only a portion of the SPS HARQ-ACK/NACK bits are deferred and a given DL slot (e.g., a slot N) is set as the target slot for the transmission of the deferred SPS HARQ-ACK/NACK, and also SFI or PUCCH carrier switching change the amount of UL symbols in the target slot (i.e., the available PUCCH resource in the target slot changes), then the UE may be configured to drop the deferred SPS HARQ-ACK/NACK. Moreover, if the bits from a given HARQ process ID are deferred and are still stored in a HARQ process ID buffer in the UE and some new DL data arrives for the same HARQ Process ID, then the UE may be configured to drop the stored (i.e., about to be deferred) SPS HARQ-ACK/NACK bits.

In yet other aspects, it is noted that if there is a low priority (LP) SPS HARQ-ACK/NACK that collides with a high priority (HP) HARQ-ACK/NACK, then a UE may be configured to drop the LP SPS HARQ-ACK/NACK and not defer transmission of the LP SPS HARQ-ACK/NACK.

In still further aspects, it is noted that if SPS HARQ-ACK/NACK bits are deferred and the UE is in search of a "target slot" and the UE receives DCI for a Type 3 HARQ-ACK/NACK codebook (CB), the UE may be configured to drop the deferred SPS HARQ-ACK/NACK. Additionally, for SPS HARQ-ACK/NACK deferral, only those SPS HARQ-ACK/NACK bits that are subject to deferral from the HARQ-ACK codebook from an initial PUCCH slot are deferred to the target PUCCH slot. For SPS HARQ-ACK deferral, if after the target PUCCH slot determination the deferred SPS HARQ-ACK cannot be transmitted, the deferred SPS HARQ-ACK bits are not further deferred and are dropped.

In other aspects, it is noted that for SPS HARQ-ACK/NACK deferral, if a UE is not configured with intra-UE multiplexing, but rather is configured with physical layer (PHY) prioritization, the UE may be configured to first perform UCI multiplexing and PHY prioritization in both an initial slot and a target slot. If a low priority (LP) SPS HARQ-ACK/NACK PUCCH is deprioritized, the UE is then configured to not defer the LP SPS HARQ-ACK/NACK. Also, if the SPS HARQ-ACK/NACK is deprioritized in any slot, no further deferral is performed.

In yet other aspects, a UE may be configured to include a simultaneous configuration of a Type 3 HARQ-ACK codebook (e.g., 3GPP Release 16) or enhanced Type 3 HARQ-ACK/NACK codebook triggering and an SPS HARQ-ACK/NACK deferral. In the case of a Type 3 HARQ-ACK codebook or an enhanced Type 3 HARQ-ACK codebook triggered for transmission in a PUCCH slot, the UE may be configured to stop the deferral procedure of a pending SPS HARQ-ACK/NACK in that PUCCH slot and then that PUCCH slot is not considered as a potential target slot for SPS HARQ-ACK/NACK deferral anymore by the UE.

Figure 10:
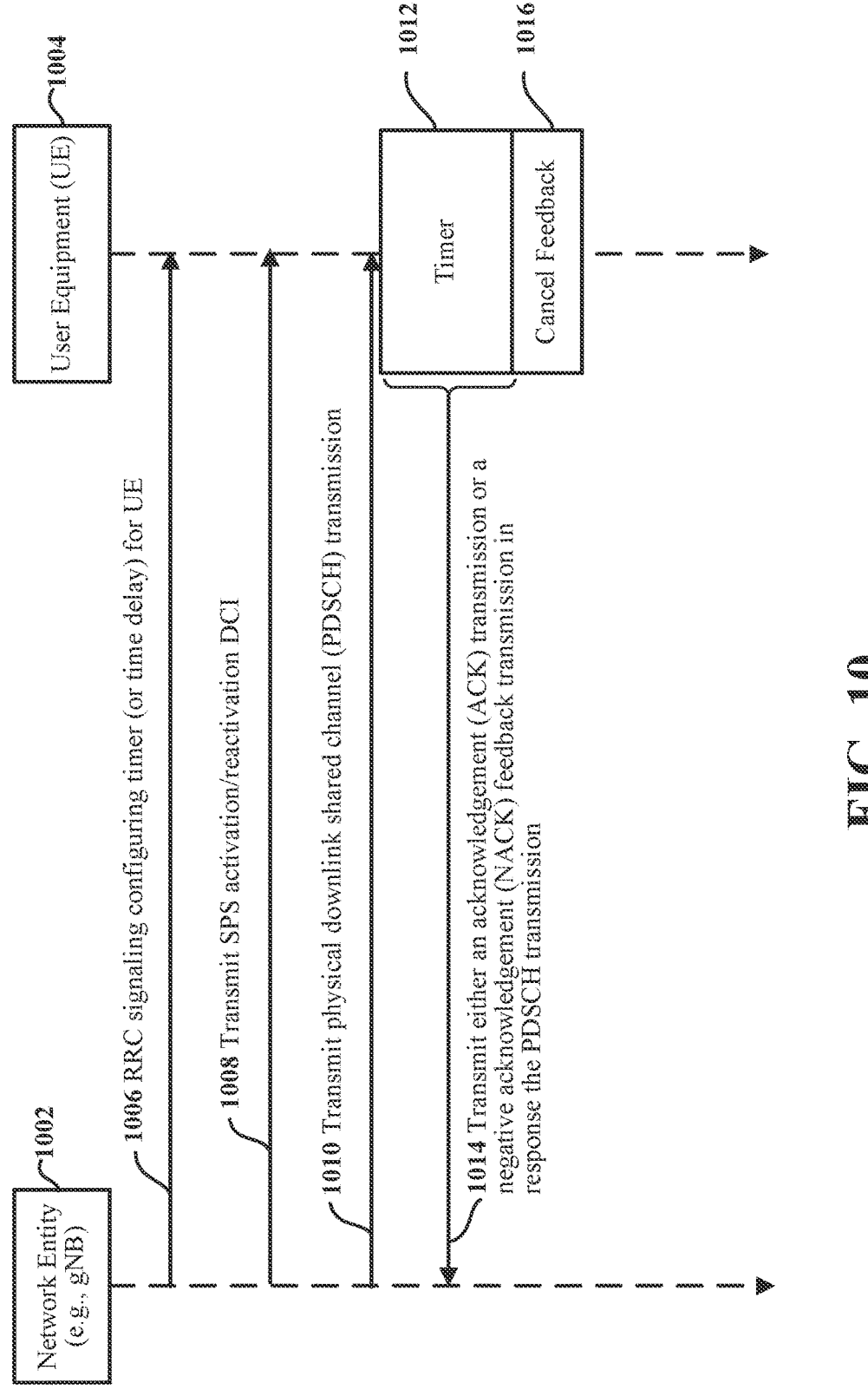
FIG. 10 is a conceptual call flow signaling diagram illustrating an exemplary procedure for communicating or establishing the timer discussed above according to some aspects.

FIG. 10 is a conceptual call flow signaling diagram 1000 illustrating an exemplary procedure for communicating or establishing the timer discussed above according to some aspects. In the example shown in FIG. 10, a network entity 1002 (e.g., a gNB) is in wireless communication with a user equipment (UE) 1004 over one or more wireless communication links. Each of the network entity 1002 and the UE 1004 may correspond to any of the entities, gNodeB s, UEs, or the like as shown in FIGS. 1-3. At 1006, the network entity 1002 may send RRC signaling that configures the timer (or time delay or deferral such as K1 or multiples thereof, as merely one example and not limited to such) in the UE. This RRC configuration also configures the UE to cancel sending of feedback (e.g., HARQ-ACK/NACK) if the UE is unable to send the feedback within the timer amount or time delay (i.e., HARQ-less feedback). In other aspects, it is noted that for SPS HARQ-ACK/NACK deferral, a maximum deferral value defined in terms of a $K1+K1_{deferred}$ value, may be further RRC configured according to a predetermined SPS configuration.

At 1008, the network entity 1002 transmits an activation or reactivation DCI to the UE 1004 on DL channels to activate (or change parameters of) the SPS operation. Sometime after activation of SPS operation (e.g., after K0 time), the network entity transmits a scheduled PDSCH for the UE as shown at 1010. In response to the receipt of the PDSCH, the UE 1004 starts the tolling of the configured time (or time delay). In this example, if the UE is able to send the ACK or NACK feedback transmission within the time, it may do so as shown by signal 1014. If the timer times out or expires before the UE is able to send the ACK or NACK feedback, then the sending of the ACK or NACK feedback is canceled as shown at 1016.

Figure 11:
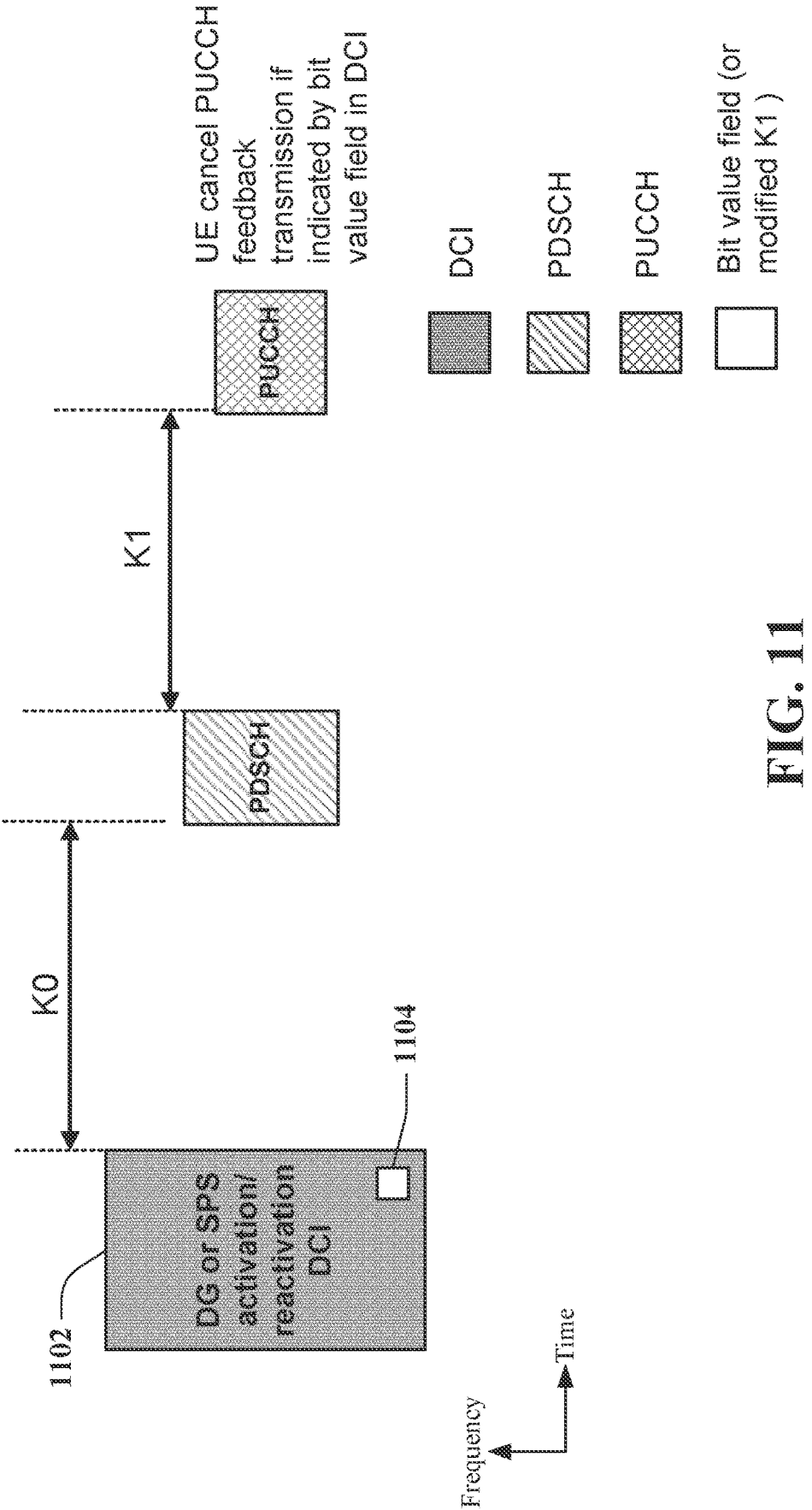
FIG. 11 illustrates a bit field included within the DCI for either DG or SPS to communicate feedback configurations according to some aspects.

In another option that could be applicable to both DG and SPS configurations, a single bit may be added to the activation/reactivation DCI (or the DG DCI), where the bit indicates to the UE to skip all sending of feedback (e.g., HARQ-ACK/NACK) for one or more DG or SPS configurations that are activated or triggered by that DCI. In one example, the bit may a first binary value (e.g., "0") to indicate that no ACK/NACK feedback is to be sent at all in response to the PDSCH, whereas the other binary value (e.g., "1) indicates that ACK/NACK feedback may be sent. As a visual example, FIG. 11 illustrates a bit field with a single bit in the DCI for either DG or SPS configurations. As shown, a DCI 1102, which may be either DCI or SPS, includes bit field 1104. The UE is configured to recognize the bit field 1104 and to either halt the sending of ACK/NACK feedback or allow the sending of ACK/NACK feedback based on the indicated bit value in the DCI. In some aspects, the UE may be configured through RRC signaling from the network to scan for the bit field 1104, determine the bit value of the bit field 1104, and effect ACK/NACK feedback cancellation based on the value.

In yet another option that may be applied to either SPS or DG configurations, a modified "negative" K1 value (or some other modification such as an invalid or non-numeric value) could be included and/or defined in the activation/reactivation DCI (or DG DCI), where this modified K1 indication will force the UE to skip HARQ-ACK feedback (i.e., use HARQ-less feedback) for the SPS PDSCH configuration activated/reactivated by the DCI. In further aspects, a negative sign of the K1 could indicate no HARQ-ACK. In other aspects, the negative sign could make the K1 value into a timer indicator rather than just the scheduled time in which to send PUCCH. For example, a negative value of −4 may mean that the UE is configured or allowed to send ACK/NACK feedback as long as the UE is able to send the feedback before the tolling of four symbols, subslots, or slots. Turning again to FIG. 11, it is noted that the bit value field 1104 may be the K1 indication in the DCI, and may be further configured to contain the negative K1 value (or other modified K1 value whether invalid or non-numeric). In some aspects, the UE may be configured through RRC signaling from the network to recognize the meaning of modified K1 value in field 1104 in the DCI and to effect ACK/NACK feedback cancellation when indicated or to establish the timer if this value is used as a timer indicator.

According to further aspects, it is noted that when DCI provided K1 is negative such as a −4, the UE is configured to understand this to signal the use of HARQ-less feedback if the UE cannot send the HARQ-ACK in any of the slots, sublots, symbols, etc. before 4 of these slots, sublots, symbols, etc. It is noted that in other aspects, the negative value could also be configured to correspond to time units. Of yet further note, as described before, RRC signaling may be used to configure the SPS PDSCH as well as configuring this negative K1 value, which denotes a timeout amount or period. In still further aspects, the K1 value in the DCI may be used by the UE in the same way as described previously; i.e., the UE will try to send HARQ-ACK/NACK feedback after the K1 time period measured from receiving the PDSCH. If there is a collision, the UE will defer transmission of the feedback as long as the deferring does not exceed the timeout value (e.g., X) defined in the configuration of the SPS PDSCH, at which time the UE can then be configured to try to send the feedback. Otherwise, the feedback transmission will be dropped and canceled when the timeout value is exceeded and HARQ-less feedback will then be assumed.

In a further example for an invalid K1 value, if the K1 has some known value range such as 000 to 100 (i.e., six values), for example, if the value is set to 110 or 111, the UE may be configured to identify such values as "invalid", thus indicating ACK/NACK feedback cancellation. Concerning negative K1 values, in one example if the K1 values are 00 and 01 with a two-bit field, for example, then values 10 and 11 may be predetermined as being negative K1 values (e.g., −1 and −2).

According to yet another option concerning SPS configurations, an event-based HARQ-ACK or HARQ-less feedback may be defined where the sending or non-sending of the HARQ-ACK/NACK feedback is tied to the occurrence of some predefined event. For example, a predefined event such as the occurrence of a collision between PUCCH and a TDD DL symbol, subslot, or slot, such as was discussed above in connection with FIG. 8, will trigger the use of HARQ-less feedback. In some other aspects, the occurrence of any collision or the occurrence of an event triggering any HARQ-ACK deferment due to a collision may be configured to mean that the UE will effect HARQ-less feedback (i.e., no feedback). In other words, if any collision or deferment occurs the UE is configured to cancel sending of the ACK or NACK feedback. In yet further aspects, the UE may also be configured such that if there is no collision, the UE will use HARQ-ACK/NACK feedback at a predetermined time from PDSCH reception (e.g., the K1 time as discussed earlier).

Figure 12:
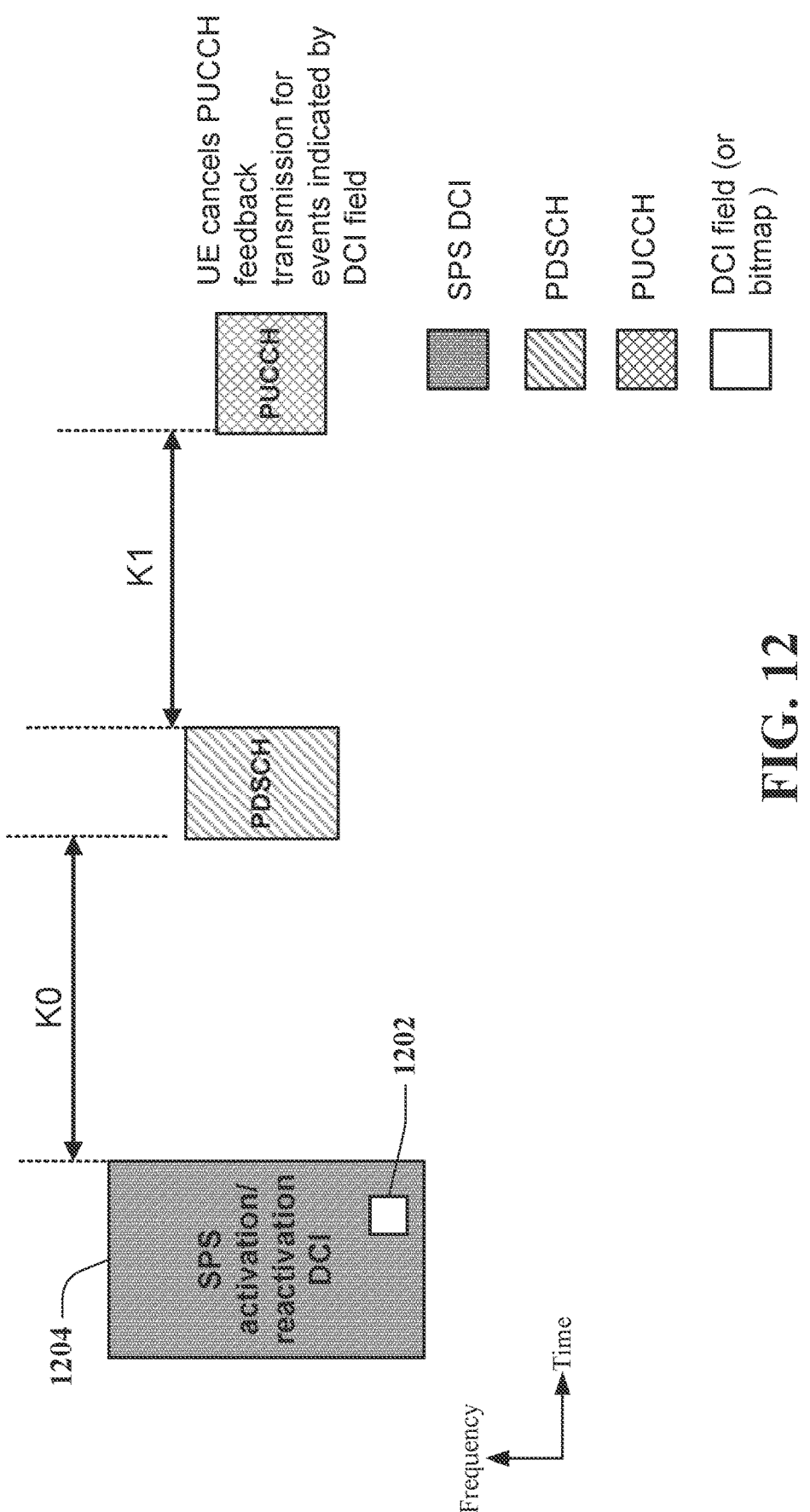
FIG. 12 illustrates a field or bitmap within an SPS activation/reactivation DCI, to communicate feedback configurations based on events according to some aspects.

In further aspects, when the event-based HARQ-ACK/NACK or HARQ-less feedback could be determined for a particular SPS configuration level or at a group SPS configuration level (i.e., two or more SPS configurations grouped together will follow the same event-based HARQ-ACK/NACK or HARQ-less feedback). A new field in the activation/reactivation DCI could be used for this purpose of event-based HARQ-less activation according to an aspect. As an illustration, FIG. 12 shows a field 1202 within an SPS activation/reactivation DCI 1204, wherein the field 1202 includes information concerning which event(s) will trigger the UE to effectuate HARQ-less feedback. In another example, the network entity may utilize RRC signaling to configure the UE for the event-based HARQ-ACK/NACK or HARQ-less feedback.

It is noted that in some SPS configured systems, such as was illustrated in the example of FIG. 9, HARQ-ACK feedback cancellation may be configured for situations when there is a collision between the PUCCH resources of SPS PDSCH configurations for high priority and low priority communications, applications, or transmissions. In SPS with same priority SPS configurations also discussed before in connection with FIG. 9, collisions between PUCCH resources and the TDD DL configuration will result in deferring of the SPS feedback to a next available UL slot, as was also discussed in the example of FIG. 9. In aspects, the present event based HARQ-ACK/NACK or HARQ-less feedback may further effect cancellation (i.e., dropping ACK/NACK feedback with also no deferring of the ACK/NACK feedback) of some SPS configurations or effect no cancelation with no dropping or deferring of the ACK/NACK feed for some other SPS configurations when a collision happens, for example. In other aspect, it is noted that the network may configure a UE to use a first timer or timeout value (e.g., X) with higher priority communications and use a second timer or timeout value (e.g., Y) for lower priority communications. In some aspects, although not limited to such, the first timer X would have a shorter time as the high priority communications have tighter timing requirements, whereas the second timer Y could have a longer time for the low priority communications. In further aspects, these two timeouts X and Y could be signaled to the UE through RRC signaling from the network (e.g., a gNB).

In yet another example, a bitmap may be included in an activation/reactivation or deactivation DCI that contains information indicating each SPS configuration/occasion that will utilize either HARQ-less or HARQ-ACK/NACK based feedback. Referring again to FIG. 12, it is noted that the field 1202 may be configured with this bitmap. In yet a further example, it is noted that even in instances where a HARQ-ACK/NACK feedback is provided in at least one instance, the indication in the bitmap may allow for a subsequent cancellation of HARQ-ACK/NACK feedback after some further time if a timer expires, such as the timer discussed above in connection with FIG. 10, as one example.

With regard to the examples discussed above, it is noted that the determination of whether to transmit an acknowledgement (ACK) transmission or a negative acknowledgement (NACK) transmission from a UE to a network entity in response to a PDSCH transmission, the determination is generally based on at least a predetermined condition configured by the network (and more specifically via a network entity in communication with the UE). Furthermore, the predetermined condition may be based on a timer or timeout conditions configured by the network or network entity for every SPS configuration such as was described in connection with the example of FIG. 10 (or groups of SPS configurations). Additionally, the predetermined condition may be the active indication in DCI (such as activation DCI or DG DCI), that indicates to the UE that acknowledgement (ACK) or negative acknowledgement (NACK) transmissions are canceled for particular SPS configurations. In an aspect, it is noted that this indication may be determined based on knowledge of the timing of the particular SPS configuration and that the UE will not be capable of sending the ACK/NACK feedback in time before other transmissions will need to be sent in the wireless system. Thus, this may be thought of also as related to a timer, timeout, or timing that is fixed for each SPS configuration. Yet further concerning the modified K1 values, beyond an indication of a timer value or timeout value (e.g., negative values thereof mapped to a number of symbols, subslots, or slots), the modified K1 indication signaling cancelation of HARQ-ACK/NACK again may be related to a timer or timing that is fixed for each SPS configuration.

Figure 13:
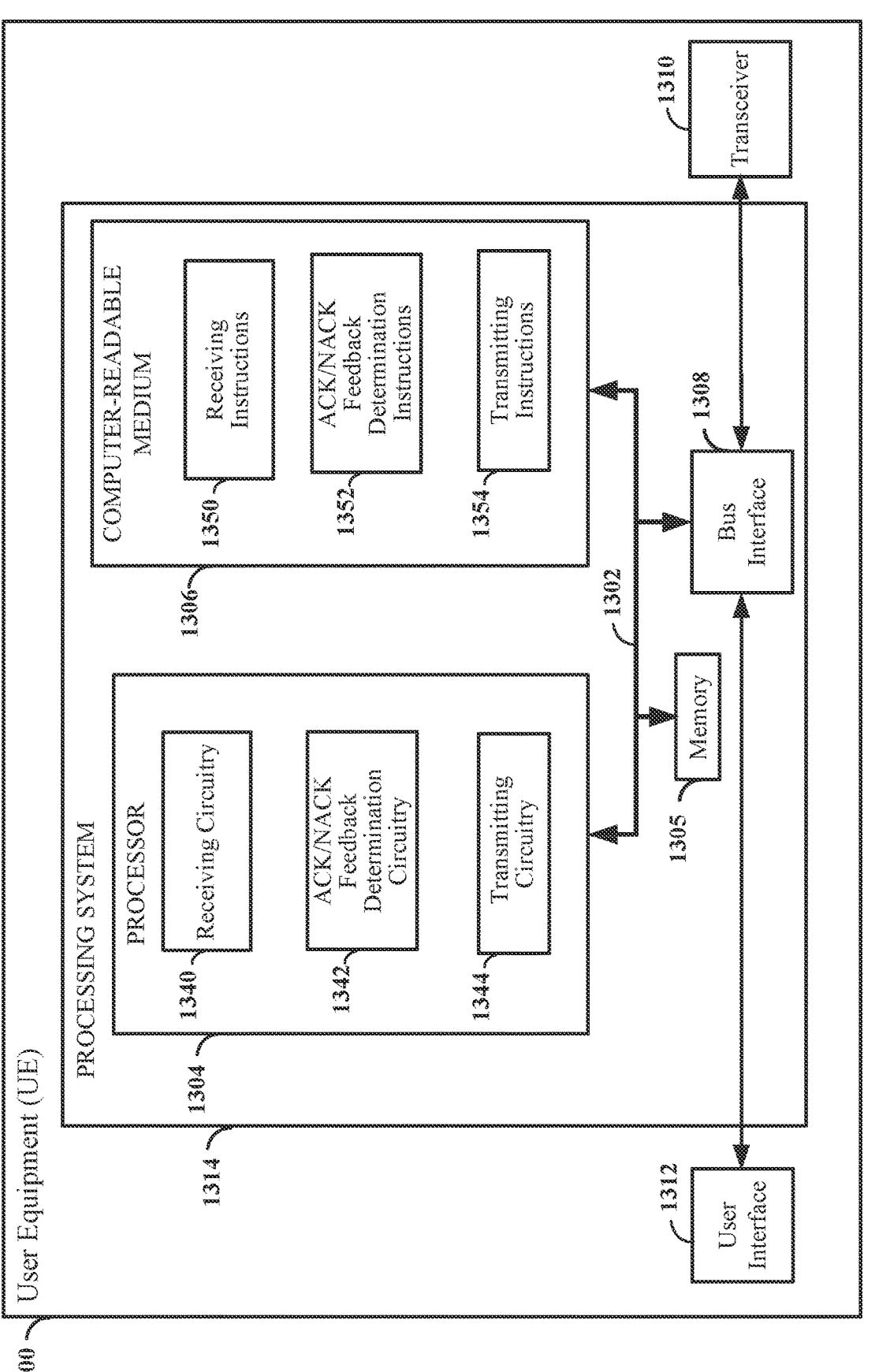
FIG. 13 is a block diagram conceptually illustrating an example of a hardware implementation for UE according to some aspects.

FIG. 13 is a block diagram illustrating an example of a hardware implementation for a user equipment (UE) 1300 employing a processing system 1314. For example, the UE 1300 may be any of the user equipment (UEs) illustrated in any one or more of FIGS. 1-3 and 10.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes described herein. The processor 1304 may in some instances be implemented via a baseband or modem chip and in other implementations, the processor 1304 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), and computer-readable media (represented generally by the computer-readable storage medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a means for communicating with various other apparatus over a transmission medium (e.g., air interface). A user interface 1312 (e.g., keypad, display, speaker, microphone, joystick) may also be provided.

The processor 1304 is responsible for managing the bus 1302 and general processing, including the execution of software stored on the computer-readable storage medium 1306. The software, when executed by the processor 1304, causes the processing system 1314 to perform the various functions described herein for any particular apparatus. The computer-readable storage medium 1306 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1306.

The computer-readable storage medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1306 may reside in the processing system 1314, external to the processing system 1314, or distributed across multiple entities including the processing system 1314. The computer-readable storage medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. For example, the processor 1304 may include receiving circuitry 1340 configured to receive a physical downlink shared channel (PDSCH) transmission from a network entity such as a gNB. The receiving circuitry 1340 may also be configured to receive downlink control information (DCI) associated with the PDSCH transmission, where the DCI indicates dynamic grant scheduling or activation, deactivation, or reactivation of semi persistent scheduling (SPS). The receiving circuitry 1340 may also be configured to receive information within the DCI, such as the information discussed above in connection with FIGS. 11 and 12 concerning conditions for determining whether or not ACK/NACK transmissions responsive to the PDSCH will canceled including timing or timeout information about how long the UE will have to send an ACK/NACK transmission before canceling the transmission. The receiving circuitry 1340 may be configured to execute receiving instructions 1350 stored in the computer-readable storage medium 1306 to implement any of the one or more of the functions described herein.

In some aspects of the disclosure, the receiving circuitry 1342 may be configured to receive RRC configurations concerning timeout from the network entity (e.g., gNB). In particular aspects in the case of higher and lower priority configurations such as was illustrated in FIG. 9, RRC signaling received from the network via receiving circuitry 1340 may be configured to configure the UE to use a first timer or timeout value with higher priority applications or transmission (e.g., a timeout "X" value for higher priority configurations), while using a second timer or timeout value for lower priority transmissions (e.g., a timeout "Y" value for lower priority configurations). The receiving circuitry 1340 may be configured to execute receiving instructions 1350 stored in the computer-readable storage medium 1306 to implement any of the one or more of these functions.

In some aspects of the disclosure, the processor 1304 may also include acknowledgment/negative acknowledgement (ACK/NACK) feedback determination circuitry 1342 configured to transmit either an acknowledgement (ACK) transmission or a negative acknowledgement (NACK) transmission to the base station in response to a reception of the PDSCH transmission. According to further aspects, the ACK/NACK feedback determination circuitry 1342 may also be configured to determine whether to cancel or not send transmission of the ACK or NACK feedback (or other UCI) to the network entity in a PUCCH based on various conditions/timing (e.g., a timeout value X) as disclosed herein with respect to FIGS. 5-12. Yet further, the ACK/NACK feedback determination circuitry 1342 may be configured to determine whether or not to send feedback for different SPS configurations (e.g., high and low priority) based on the X and Y timeout values disclosed above. The ACK/NACK feedback determination circuitry 1342 may be configured to execute ACK/NACK feedback determination instructions 1352 stored in the computer-readable storage medium 1306 to implement any of the one or more of the functions described herein.

In some other aspects of the disclosure, the processor 1304 may also include transmitting circuitry 1344 configured to transmit a physical uplink control channel (PUCCH) including the ACK or NACK feedback. In certain aspects, transmitting circuitry 1344 is configured to attempt to transmit the PUCCH after a predetermined time (e.g., K1) from the receipt of the PUSCH in the receiving circuitry 1340. Additionally, the transmitting circuitry 1344 may assist in determining if a conflict arises between the PUCCH and DL TDD slots, subslots, or symbols. Moreover, the transmitting circuitry 1344 is configured to communicate with the ACK/NACK feedback determination circuitry 1342 and to halt, stop, or cancel transmission of the ACK/NACK feedback in the PUCCH when the ACK/NACK feedback determination circuitry 1342 decides that the feedback is to be canceled based on one or more of the conditions described above in connection with FIGS. 5-12. The transmitting circuitry 1344 may be configured to execute transmitting instructions 1354 stored in the computer-readable storage medium 1306 to implement any of the one or more of the functions described herein.

Figure 14:
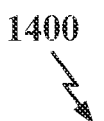
FIG. 14 is a flow chart of a method for implementing feedback in a UE in a wireless system according to some aspects.
Figure 14:
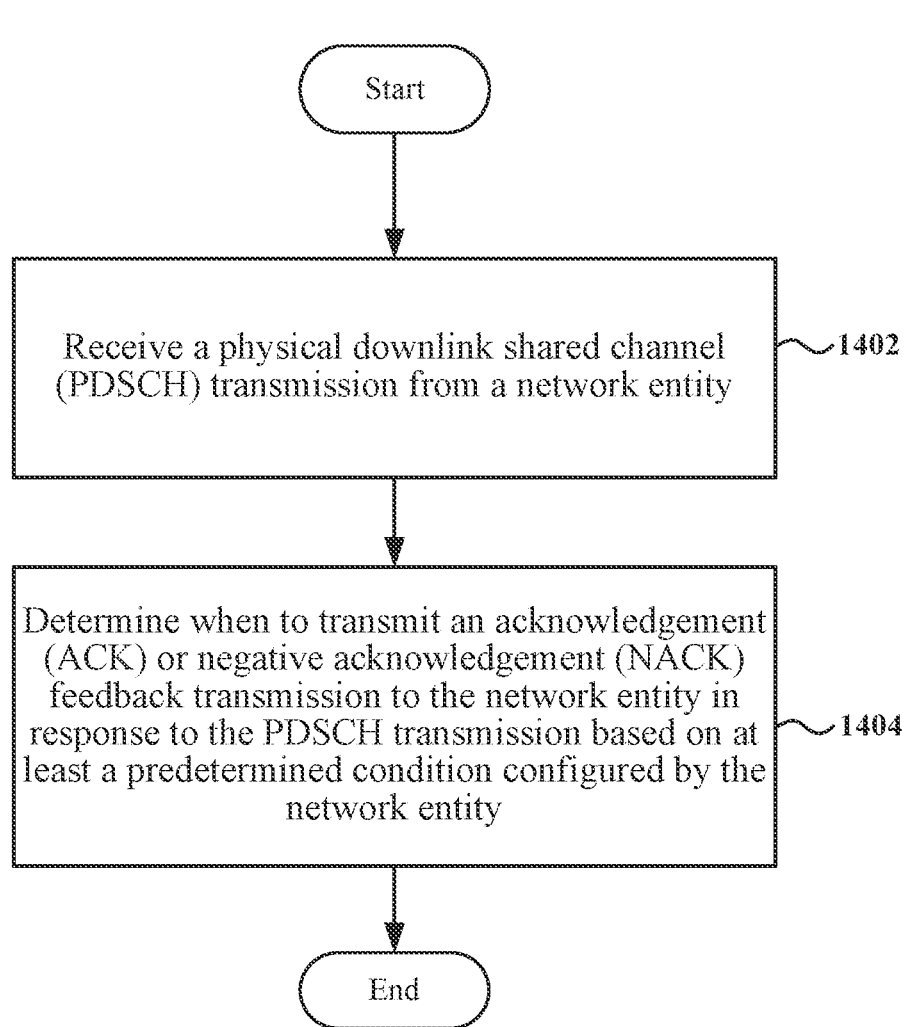

FIG. 14 is a flow chart 1400 of a method for determining whether or not to send ACK/NACK feedback in a UE according to some aspects. As described below, some or all illustrated features may be omitted in a particular implementation within the scope of the present disclosure, and some illustrated features may not be required for implementation of all aspects. In some examples, the method 1400 may be performed by the UE 1300, as described above, and illustrated in FIG. 13, by a processor or processing system, or by any suitable means for carrying out the described functions.

At block 1402, the UE 1300 may receive a PDSCH transmission from a network entity. At block 1404, the UE 1300 may make a determination whether to or when to transmit an acknowledgement (ACK) or negative acknowledgement (NACK) feedback transmission (referred to also as ACK/NACK feedback transmission) to the network entity in response to the PDSCH transmission based on at least a predetermined condition configured by the network entity. In some aspects, the UE 1300 receives the predetermined condition, which may be timing conditions or other condition information such as was described in connection with FIGS. 5-12, through DG DCI, activation/reactivation DCI, and/or RRC signaling from the network entity. In particular aspects, the ACK/NACK feedback is HARQ-ACK/NACK and a decision to cancel sending of the HARQ-ACK/NACK feedback is referred to as HARQ-less feedback.

According to further aspects, method 1400 may include that the predetermined condition comprises a timer condition defining a timeout period that is measured from the time of reception of the PDSCH in the UE 1300 to a predefined time after reception of the PDSCH. In this case, the timeout period defines a time in which the ACK/NACK feedback transmission may be sent to the network entity and may correspond to a time such as the K1 time (but not limited to such and may be different than K1), and also may be measured in terms of a number of slots, subslots, or symbols. In a particular aspect, the UE 1300 may be configured to cancel the ACK/NACK feedback transmission when the ACK/NACK feedback transmission is not sent during the timeout period. In yet further aspects, it is noted that the timeout period may be predefined for a semi persistent scheduling (SPS) configuration (or for each SPS configuration of multiple SPS configurations), as the SPS timing is scheduled at the periodicity p discussed before and timing of signals is more stringent than dynamic scheduling, for example.

In further aspects, method 1400 may include that the predetermined condition is indicated in a portion of downlink control information (DCI) received from the network entity that activates either SPS or dynamic scheduling, such as bit fields or bit maps in the DCI as discussed above with respect to FIGS. 11 and 12. In some aspects, the portion of the DCI comprises a bit field where a particular bit value (e.g., 0 or 1) is configured to communicate to the UE to cancel the ACK/NACK feedback transmission for one or more particular SPS or dynamic scheduling configurations.

In further aspects, method 1400 may include that the predetermined condition is indicated in a portion of downlink control information (DCI) received from the network entity that activates either SPS or dynamic scheduling, where the portion of the DCI comprises a modified physical uplink control channel (PUCCH) grant time (e.g., K1) that schedules the time of ACK/NACK feedback transmission (e.g., in PUCCH) after receiving the PDSCH. The modified PUCCH grant time is configured to indicate either cancelling the ACK/NACK feedback transmission or to indicate a timeout period defining a time in which the ACK/NACK feedback transmission may be sent to the network entity. As discussed above, the modified PUCCH grant time K1 may be modified by one of changing a value of the PUCCH grant time K1 in the DCI to a negative of the K1 value, an invalid value, or a non-numeric value. In other aspects, the negative of the K1 value is configured to indicate to the UE not to send either the ACK/NACK feedback transmission. In yet other aspects, the negative of the K1 value is configured to indicate to the UE a time limit indication within which the UE may send either the ACK/NACK feedback transmission.

In another aspect of method 1400, the predetermined condition may include the UE 1300 determining whether a predetermined event occurs (e.g., a collision). If the event occurs, the UE 1300 may be configured to then cancel the ACK/NACK feedback transmission. In a particular aspect, the event may be defined as a collision between physical uplink control channel (PUCCH) resources scheduled for transmission of the ACK/NACK feedback transmission and a time division duplex (TDD) scheduled downlink symbol, subslot, or slot. In still other aspect, the event determination may include determining the SPS configuration for the PUCCH resources. From this, the UE may determine whether to cancel the ACK/NACK feedback transmission based on when the collision occurs and based on the determined SPS configuration. For example, if a high priority SPS configuration encounters a collision, the UE may not send the ACK/NACK feedback as timing is more critical, whereas for a lower priority SPS configuration, the UE may send the feedback as timing is less stringent. In yet other aspects of method 1400, the predetermined event may include a collision between PUCCH resources for a first SPS PDSCH having a first priority and PUCCH resources for a second SPS PDSCH having a second priority lower than the first priority.

Method 1400 may further include the UE 1300 receiving an indication of the predetermined event in a bit field of a DCI scheduling the ACK/NACK feedback transmission or in radio resource control (RRC) signaling from the network entity. Moreover, the predetermined condition may be applied for a plurality or group of SPS PDSCH configurations.

In further aspects, the predetermined condition in method 1400 may include one or more timer conditions defining respective timeout periods that are each measured from the time of reception of the PDSCH to a corresponding predefined time after reception of PDSCH for respective semi persistent scheduling (SPS) configurations. In this case, the one or more timer conditions may be communicated by the network entity in a bitmap within an activation or reactivation DCI. wherein the one or more timer conditions may include canceling the ACK/NACK feedback transmission after expiration of the timer condition, not cancelling the ACK/NACK feedback transmission after expiration of the timer condition, or not canceling the ACK/NACK feedback transmission for a predetermined number of expirations of the timer condition and then canceling all further ACK/NACK feedback transmissions after the predetermined number of expirations has been exceeded.

Yet further, method 1400 may include determine whether or not to send feedback for different SPS configurations (e.g., high and low priority) based on the X and Y timer or timeout values provided or configured by the network (e.g., an gNB). In this case, the predetermined condition of method 1400 may include determining if the communication is high or low priority and then applying the respective X or Y timer or timeout values for determining whether or not to send ACK/NACK feedback to the network entity.

Figure 15:
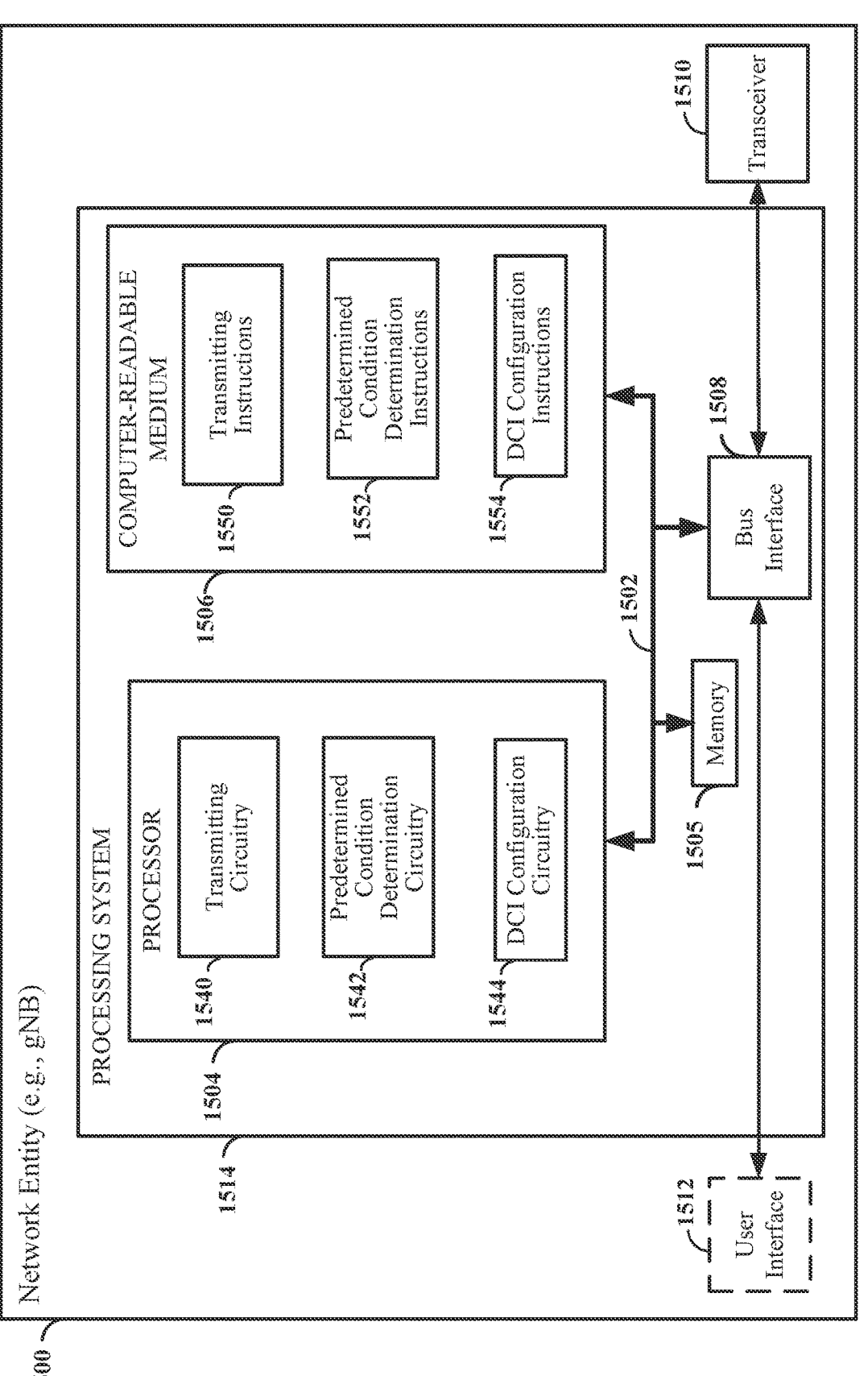
FIG. 15 is a block diagram conceptually illustrating an example of a hardware implementation for a network entity according to some aspects.

FIG. 15 is a block diagram illustrating an example of a hardware implementation for a network entity, gNB, or a base station 1500 employing a processing system 1514 according to some aspects. For example, the network entity 1500 may correspond to any of the devices or systems shown and described herein in any one or more of FIGS. 1-3 and 10.

In accordance with various aspects of the disclosure, an element, or any portion of an element, or any combination of elements may be implemented with a processing system 1514 that includes one or more processors 1504. The processing system 1514 may be substantially the same as the processing system 1314 illustrated in FIG. 13, including a bus interface 1508, a bus 1502, a processor 1504, and a computer-readable storage medium 1506. Furthermore, the network entity 1500 may include a user interface 1512 and a transceiver 1510 substantially similar to those described above in FIG. 13. That is, the processor 1504, as utilized in the network entity 1500, may be used to implement any one or more of the processes described herein.

In some aspects of the disclosure, the processor 1504 may include circuitry configured for various functions. For example, the processor 1504 may include transmitting circuitry 1540 configured to transmit a physical downlink shared channel (PDSCH) to a user equipment (UE). The transmitting circuitry 1540 may also be configured to transmit downlink control information (DCI) associated with the PDSCH transmission, where the DCI activates dynamic scheduling or SPS, among other things. The transmitting circuitry 1540 may further be configured to transmit the predetermined condition information to the UE, which was discussed above in connection with FIG. 14, that allows the UE to determine whether or not to send ACK/NACK feedback in dynamic scheduling or SPS configurations in response to the PDSCH transmissions. The transmitting circuitry 1540 may also be configured to transmit Tx parameters within the DCI such as modulation and coding scheme (MCS), resource block (RB) allocations, or antenna ports associated with SPS transmissions, for example. In yet other aspects, transmitting circuitry 1540 may implement radio resource control RRC configuration signaling used to configure the UE HARQ-ACK feedback resources and the expected SPS periodicity and the HARQ-ACK feedback resources. Further, the RRC signaling may also effect setting the timeout value and communicating the condition event as discussed before. The transmitting circuitry 1540 may be configured to execute transmitting instructions 1550 stored in the computer-readable storage medium 1506 to implement any of the one or more of the functions described herein.

In some further aspects, the processor 1504 may also include predetermined condition determination circuitry 1542 configured to determine the predetermined condition (s) to be communicated to the UE. In aspects, the predetermined condition determination circuitry 1542 may determine a timeout period in which a UE is to send ACK/NACK feedback and after which the UE is to cancel sending of the ACK/NACK feedback. In other aspects, the predetermined condition determination circuitry 1542 may determine the adding of a single bit in an activation/reactivation DCI to indicate to the UE to cancel or skip all HARQ-ACK of one or more SPS configurations activated or reactivated by that DCI. In yet further aspects, the predetermined condition determination circuitry 1542 may be configured to modify the K1 value in the activation/reactivation DCI as discussed earlier, including a negative K1 value or an invalid or non-numeric value to signal to a UE to cancel or skip HARQ-ACK, for example. In still further examples, the predetermined condition determination circuitry 1542 may be configured to define an event-based HARQ-ACK or HARQ-less feedback, such as behavior of the UE to take when encountering collision between PUCCH and TDD DL symbols, subslots, or slots. The predetermined condition determination circuitry 1542 may further be configured to execute receiving instructions 1552 stored in the computer-readable storage medium 1506 to implement any of the one or more of the functions described herein.

In some further aspects, the processor 1504 may also include predetermined condition determination circuitry 1542 configured to determine other predetermined condition (s) to be communicated to the UE. In another aspect, the predetermined condition includes a first collision between physical uplink control channel (PUCCH) resources scheduled for transmission of the ACK/NACK feedback transmission and a time division duplex (TDD) scheduled downlink symbol, subslot, or slot. Additionally, the predetermined condition includes a second collision between PUCCH resources for a first SPS PDSCH having a first priority and PUCCH resources for a second SPS PDSCH having a second priority lower than the first priority.

Additionally, the predetermined condition determination circuitry 1542 may be configured to determine RRC configurations concerning the timeout or timer values to communicate to the UE with regard to high and low priority communications, such as were illustrated in FIG. 9. In this case, the predetermined condition determination circuitry 1542 may be configured to configure a UE to use a first timer or timeout value with higher priority applications or transmission (e.g., an X value for higher priority configurations), while using a second timer or timeout value for lower priority transmissions (e.g., a Y value for lower priority configurations).

In some aspects of the disclosure, the processor 1504 may further include DCI configuration circuitry 1544. In an aspect, the DCI configuration circuitry 1544 may be configured to configure an activation DCI to include various fields such as a bit value field, the modified K1 value, or a bitmap as was discussed before. The DCI configuration circuitry 1544 may further be configured to execute determining instructions 1554 stored in the computer-readable storage medium 1506 to implement any of the one or more of the functions described herein.

Figure 16:
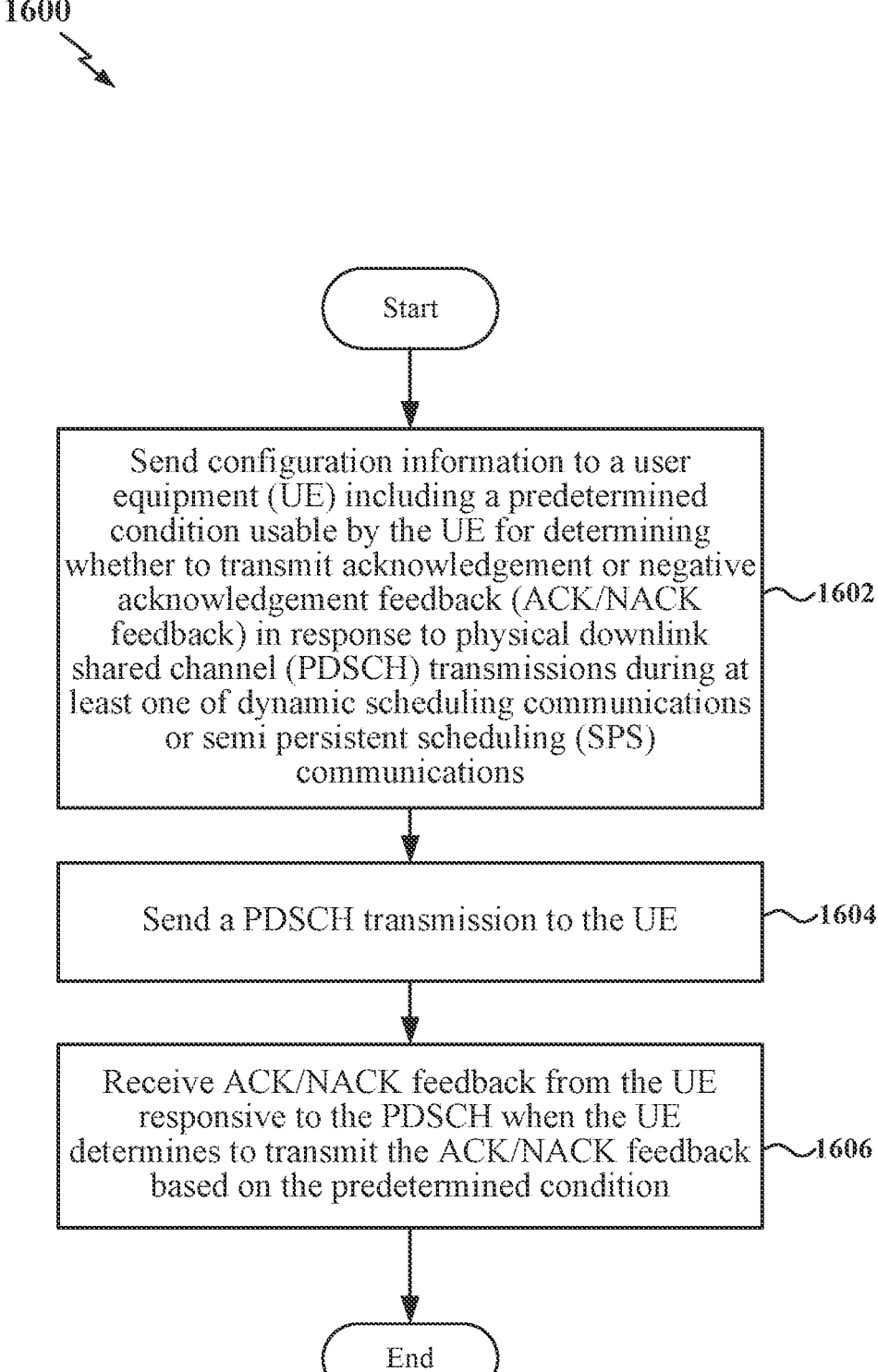
FIG. 16 is a flow chart of a method for implementing communication of feedback conditions in a network entity according to some aspects.

FIG. 16 is a flow chart 1600 of a method in a network entity for sending configuration for determining whether to cancel ACK/NACK feedback in a UE according to some aspects. As described below, some or all illustrated features may be omitted in a particular implementation within the scope of the present disclosure, and some illustrated features may not be required for implementation of all aspects. In some examples, the method 1600 may be performed by the network entity 1500 as described above, and illustrated in FIG. 15, by a processor or processing system, or by any suitable means for carrying out the described functions.

At block 1602, method 1600 includes sending configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications. Additionally, method 1600 includes sending a PDSCH transmission to the UE as shown at block 1604. Further, in some aspects method 1600 may include receiving ACK/NACK feedback from the UE responsive to the PDSCH when the UE determines to transmit the ACK/NACK feedback based on the predetermined condition as shown at block 1606. It is noted that the process of block 1606 is conditional on whether the predetermined condition is met or not, and that the network entity may not receive the ACK/NACK feedback when cancelled by the UE. In other aspects, it is noted that the lack a receipt of feedback from the UE may be expected at the network entity 1500 in the case of a HARQ-less feedback being affirmatively implemented by the network entity, such as in the case of a bit field in the DCI indicating to the UE to skip all HARQ-ACK/NACK as described above.

In further aspects, method 1600 may include sending the configuration information to the UE in downlink control information (DCI) used for initiating at least one of dynamic scheduling communications or semi persistent scheduling (SPS) communications by sending downlink control information (DCI) to the UE. In some examples, at least part of the configuration information may be sent via RRC signaling to the UE. Still further, it is noted that the configuration of the DCI may include a bit field, modified grant time value (e.g., a modified PUCCH grant time K1), or a bitmap as discussed previously. In still further aspects, method 1600 may include that the configuration information comprises a timer condition defining a timeout period that is measured from the time of reception of the PDSCH to a predefined time after reception of the PDSCH, wherein the timeout period defines a time in which the ACK/NACK feedback transmission may be sent to the network entity and after which the UE cancels the ACK/NACK feedback transmission.

In still other aspects, method 1600 may include sending or configuring X and Y timer or timeout values for different respective SPS configurations (e.g., high and low priority SPS configuration). In a particular aspect, method 1600 includes the network entity 1500 configuring a UE with the X and Y timer or timeout values, such as via RRC signaling in one example.

In one configuration, a wireless communication device such as a UE may include means for receiving a physical downlink shared channel (PDSCH) transmission from a network entity, and means for determining whether to transmit an acknowledgement (ACK) or negative acknowledgement (NACK) feedback transmission (ACK/NACK feedback transmission) to the network entity in response to the PDSCH transmission based on at least a predetermined condition configured by the network entity.

In one aspect, the aforementioned means for receiving a physical downlink shared channel (PDSCH) transmission from a network entity and means for determining whether to transmit an acknowledgement (ACK) or negative acknowledgement (NACK) feedback transmission (ACK/NACK feedback transmission) to the network entity in response to the PDSCH transmission based on at least a predetermined condition configured by the network entity may be the processor(s) 1304 shown in FIG. 13 configured to perform the functions recited by the aforementioned means. For example, the aforementioned means for receiving a physical downlink shared channel (PDSCH) transmission from a network entity may include the receiving circuitry 1340 and transceiver 1310 in FIG. 13 or equivalents thereof. As another example, the aforementioned means for and means for determining whether to transmit an acknowledgement (ACK) or negative acknowledgement (NACK) feedback transmission (ACK/NACK feedback transmission) to the network entity in response to the PDSCH transmission based on at least a predetermined condition configured by the network entity may include the ACK/NACK feedback determination circuitry 1342, as well as transmitting circuitry 1344 and transceiver 1310 shown in FIG. 13, or equivalents thereof. In another aspect, the aforementioned means may be a circuit or any apparatus configured to perform the functions recited by the aforementioned means.

In one configuration, a network entity includes means for sending configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications, means for sending a PDSCH transmission to the UE, and means for receiving ACK/NACK feedback from the UE responsive to the PDSCH when the UE determines to transmit the ACK/NACK feedback based on the predetermined condition.

In one aspect, the aforementioned means for means for sending configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications, means for sending a PDSCH transmission to the UE, and means for receiving ACK/NACK feedback from the UE responsive to the PDSCH when the UE determines to transmit the ACK/NACK feedback based on the predetermined condition may be the processor(s) 1504 shown in FIG. 15 configured to perform the functions recited by the aforementioned means. For example, the aforementioned means for sending configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications may include one or more of the transmitting circuitry 1540, the predetermined condition determination circuitry 1542, the DCI configuration circuitry 1544, and transceiver 1510 shown in FIG. 15, or equivalents thereof. As another example, the aforementioned means for sending a PDSCH transmission to the UE may include the transmitting circuitry 1540 and transceiver 1510 shown in FIG. 15, or equivalents thereof. As another example, the aforementioned means for receiving ACK/NACK feedback from the UE responsive to the PDSCH when the UE determines to transmit the ACK/NACK feedback based on the predetermined condition may include the transceiver 1510 as shown in FIG. 15, or equivalents thereof. In another aspect, the aforementioned means may be a circuit or any apparatus configured to perform the functions recited by the aforementioned means.

The following provides an overview of aspects of the present disclosure:

Aspect 1: A method for wireless communication by a user equipment (UE), comprising receiving a physical downlink shared channel (PDSCH) transmission from a network entity, and determining whether to transmit an acknowledgement (ACK) or negative acknowledgement (NACK) feedback transmission (ACK/NACK feedback transmission) to the network entity in response to the PDSCH transmission based on at least a predetermined condition configured by the network entity.

Aspect 2: The method of aspect 1, wherein the predetermined condition comprises a timer condition defining a timeout period that is measured from the time of reception of the PDSCH to a predefined time after reception of the PDSCH, wherein the timeout period defines a time in which the ACK/NACK feedback transmission may be sent to the network entity.

Aspect 3: The method of aspects 1 or 2, including canceling the ACK/NACK feedback transmission when the ACK/NACK feedback transmission is not sent during the timeout period.

Aspect 4: The method of any of aspects 1 through 3, wherein the timeout period is predefined for a semi persistent scheduling (SPS) configuration.

Aspect 5: The method any of aspects 1 through 4, wherein the predetermined condition comprises a condition indicated in a portion of downlink control information (DCI) received from the network entity that activates either SPS or dynamic scheduling, wherein the portion of the DCI comprises a bit field where a particular bit value is configured to communicate to the UE to cancel the ACK/NACK feedback transmission for one or more particular SPS or dynamic scheduling configurations.

Aspect 6: The method any of aspects 1 through 5, wherein the predetermined condition comprises a condition indicated in a portion of downlink control information (DCI) received from the network entity that activates either SPS or dynamic scheduling, wherein the portion of the DCI comprises a modified physical uplink control channel (PUCCH) grant time K1 scheduling ACK/NACK feedback transmission after receiving the PDSCH, wherein the modified PUCCH grant time is configured to indicate either cancelling the ACK/NACK feedback transmission or to indicate a timeout period defining a time in which the ACK/NACK feedback transmission may be sent to the network entity.

Aspect 7: The method any of aspects 1 through 6, wherein the modified PUCCH grant time K1 is modified by one of changing a value of the PUCCH grant time K1 in the DCI to a negative of the K1 value, an invalid value, or a non-numeric value.

Aspect 8: The method any of aspects 1 through 7, wherein the negative of the K1 value is configured to indicate to the UE not to send either the ACK/NACK feedback transmission.

Aspect 9: The method any of aspects 1 through 7, wherein the negative of the K1 value is configured to indicate to the UE a time limit indication within which the UE may send either the ACK/NACK feedback transmission.

Aspect 10: The method any of aspects 1 through 9, wherein the predetermined condition comprises the occurrence of predetermined event, and further comprising canceling the ACK/NACK feedback transmission when the predetermined event occurs.

Aspect 11: The method any of aspects 1 through 10, wherein the predetermined event comprises a collision between physical uplink control channel (PUCCH) resources scheduled for transmission of the ACK/NACK feedback transmission and a time division duplex (TDD) scheduled downlink symbol, subslot, or slot.

Aspect 12: The method any of aspects 1 through 11, further including determining an SPS configuration for the PUCCH resources, and determining whether to cancel the ACK/NACK feedback transmission based on when the collision occurs and based on the determined SPS configuration.

Aspect 13: The method any of aspects 1 through 12, wherein the predetermined event comprises a collision between PUCCH resources for a first SPS PDSCH having a first priority and PUCCH resources for a second SPS PDSCH having a second priority lower than the first priority.

Aspect 14: The method any of aspects 1 through 13, further comprising receiving an indication of the predetermined event in a bit field of a DCI scheduling the ACK/NACK feedback transmission or in radio resource control (RRC) signaling from the network entity.

Aspect 15: The method any of aspects 1 through 14, wherein the predetermined event is applied for a group of SPS PDSCH configurations.

Aspect 16: The method any of aspects 1 through 15, wherein the predetermined condition comprises one or more timer conditions defining respective timeout periods that are each measured from the time of reception of the PDSCH to a corresponding predefined time after reception of PDSCH for respective semi persistent scheduling (SPS) configurations, and the one or more timer conditions are communicated in a bitmap within an activation or reactivation DCI from the network entity.

Aspect 17: The method any of aspects 1 through 16, wherein the one or more timer conditions may include canceling the ACK/NACK feedback transmission after expiration of the timer condition, not cancelling the ACK/NACK feedback transmission after expiration of the timer condition, or not canceling the ACK/NACK feedback transmission for a predetermined number of expirations of the timer condition and then canceling all further ACK/NACK feedback transmissions after the predetermined number of expirations has been exceeded.

Aspect 18: A user equipment (UE) for wireless communication in a wireless communication network, comprising: a wireless transceiver; a memory; and a processor communicatively coupled to the wireless transceiver and the memory, wherein the processor and the memory are configured to: receive a physical downlink shared channel (PDSCH) transmission from a network entity; and determine when to transmit an acknowledgement (ACK) or negative acknowledgement (NACK) feedback transmission (ACK/NACK feedback transmission) to the network entity in response to the PDSCH transmission based on at least a predetermined condition configured by the network entity.

Aspect 19: The UE of aspect 18, wherein the predetermined condition comprises a timer condition defining a timeout period that is measured from the time of reception of the PDSCH to a predefined time after reception of the PDSCH, wherein the timeout period defines a time in which the ACK/NACK feedback transmission may be sent to the network entity.

Aspect 20: The UE of one of aspects 18 or 19, wherein the processor and the memory are further configured to cancel the ACK/NACK feedback transmission when the ACK/NACK feedback transmission is not sent during the timeout period.

Aspect 21: The UE of any of aspects 18 through 20, wherein the predetermined condition comprises a condition indicated in a portion of downlink control information (DCI) received from the network entity that activates either SPS or dynamic scheduling, wherein the portion of the DCI comprises a bit field where a particular bit value is configured to communicate to the UE to cancel the ACK/NACK feedback transmission for one or more particular SPS or dynamic scheduling configurations.

Aspect 22: The UE any of aspects 18 through 20, wherein the predetermined condition comprises a condition indicated in a portion of downlink control information (DCI) received from the network entity that activates either SPS or dynamic scheduling; wherein the portion of the DCI comprises a modified physical uplink control channel (PUCCH) grant time scheduling ACK/NACK feedback transmission after receiving the PDSCH; wherein the modified PUCCH grant time is configured to indicate either cancelling the ACK/NACK feedback transmission or to indicate a timeout period defining a time in which the ACK/NACK feedback transmission may be sent to the network entity; and the processor and memory further configured to: receive the portion of the DCI from the network entity; and determine the modified PUCCH grant time from the portion of the DCI.

Aspect 23: The UE of any of aspects 18 through 20, wherein the predetermined condition comprises at least one of: a first collision between physical uplink control channel (PUCCH) resources scheduled for transmission of the ACK/NACK feedback transmission and a time division duplex (TDD) scheduled downlink symbol, subslot, or slot; or a second collision between PUCCH resources for a first SPS PDSCH having a first priority and PUCCH resources for a second SPS PDSCH having a second priority lower than the first priority.

Aspect 24: The UE of aspect 18 or aspect 20, wherein the predetermined condition comprises one or more timer conditions defining respective timeout periods that are each measured from the time of reception of the PDSCH to a corresponding predefined time after reception of PDSCH for respective semi persistent scheduling (SPS) configurations; and the processor and memory are configured to: receive the one or more timer conditions in a bitmap within an activation or reactivation DCI from the network entity.

Aspect 25: A method for wireless communication by a network entity, comprising: sending configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications; sending a PDSCH transmission to the UE; and receiving ACK/NACK feedback from the UE responsive to the PDSCH when the UE determines to transmit the ACK/NACK feedback based on the predetermined condition.

Aspect 26: The method of claim 25, further comprising: sending the configuration information to the UE in downlink control information (DCI) used for initiating at least one of dynamic scheduling communications or semi persistent scheduling (SPS) communications by sending downlink control information (DCI) to the UE.

Aspect 27: The method of aspect 25 or aspect 26, wherein the configuration information comprises a timer condition defining a timeout period that is measured from the time of reception of the PDSCH to a predefined time after reception of the PDSCH, wherein the timeout period defines a time in which the ACK/NACK feedback transmission may be sent to the network entity and after which the UE cancels the ACK/NACK feedback transmission.

Aspect 28: A network entity for wireless communication in a wireless communication network, comprising: a wireless transceiver; a memory; and a processor communicatively coupled to the wireless transceiver and the memory, wherein the processor and the memory are configured to: send configuration information to a user equipment (UE) including a predetermined condition usable by the UE for determining whether to transmit acknowledgement or negative acknowledgement feedback (ACK/NACK feedback) in response to physical downlink shared channel (PDSCH) transmissions during at least one of dynamic scheduling communications or semi persistent scheduling (SPS) communications; send a PDSCH transmission to the UE; and receive ACK/NACK feedback from the UE responsive to the PDSCH when the UE determines to transmit the ACK/NACK feedback based on the predetermined condition.

Aspect 29: The network entity of aspect 28, wherein the processor and the memory are configured to: send the configuration information to the UE in downlink control information (DCI) used for initiating at least one of dynamic scheduling communications or semi persistent scheduling (SPS) communications by sending downlink control information (DCI) to the UE.

Aspect 30: The network entity of aspect 28 or aspect 29, wherein the configuration information comprises a timer condition defining a timeout period that is measured from the time of reception of the PDSCH to a predefined time after reception of the PDSCH, wherein the timeout period defines a time in which the ACK/NACK feedback transmission may be sent to the network entity and after which the UE cancels the ACK/NACK feedback transmission.

Aspect 31: An apparatus configured for wireless communication comprising at least means for performing a method of any one of aspects 1 through 17 or, alternatively, aspects 25 through 27.

Aspect 32: A non-transitory computer-readable medium storing computer-executable code, comprising code for causing an apparatus to perform a method of any one of aspects 1 through 17 or, alternatively, aspects 25 through 27.

Several aspects of a wireless communication network have been presented with reference to exemplary implementations. As those skilled in the art will readily appreciate, various aspects described throughout this disclosure may be extended to other telecommunication systems, network architectures and communication standards.

By way of example, various aspects may be implemented within other systems defined by 3GPP, such as Long Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, where reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication by a user equipment (UE), comprising:

receiving a physical downlink shared channel (PDSCH) transmission from a network entity;

determining when to transmit an acknowledgement (ACK) or negative acknowledgement (NACK) feedback transmission (ACK/NACK feedback transmission) to the network entity in response to the PDSCH transmission based on at least a predetermined condition configured by the network entity, the predetermined condition comprising the occurrence of a predetermined event; and canceling the ACK/NACK feedback transmission when the predetermined event occurs, wherein the predetermined event comprises a collision between physical uplink control channel (PUCCH) resources for a first semi persistent scheduling (SPS) PDSCH having a first priority and PUCCH resources for a second SPS PDSCH having a second priority lower than the first priority.

2. The method of claim 1, wherein the predetermined condition comprises a timer condition defining a timeout period that is measured from the time of reception of the PDSCH to a predefined time after reception of the PDSCH, wherein the timeout period defines a time in which the UE is capable of sending the ACK/NACK feedback transmission to the network entity.

3. The method of claim 2, further comprising:

canceling the ACK/NACK feedback transmission when the ACK/NACK feedback transmission is not sent during the timeout period.

4. The method of claim 2, wherein the timeout period is predefined for a SPS configuration.

5. The method of claim 1, wherein the predetermined condition comprises a condition indicated in a portion of downlink control information (DCI) received from the network entity that activates either SPS or dynamic scheduling, wherein the portion of the DCI comprises a bit field where a particular bit value is configured to communicate to the UE to cancel the ACK/NACK feedback transmission for one or more particular SPS or dynamic scheduling configurations.

6. The method of claim 1, wherein the predetermined condition comprises a condition indicated in a portion of downlink control information (DCI) received from the network entity that activates either SPS or dynamic scheduling, wherein the portion of the DCI comprises a modified PUCCH grant time K1 scheduling the ACK/NACK feedback transmission after receiving the PDSCH, wherein the modified PUCCH grant time K1 is configured to indicate either cancelling the ACK/NACK feedback transmission or to indicate a timeout period defining a time in which the UE is capable of sending the ACK/NACK feedback transmission to the network entity.

7. The method of claim 6, wherein the modified PUCCH grant time K1 is modified by one of changing a value of the PUCCH grant time K1 in the DCI to a negative of the K1 value, an invalid value, or a non-numeric value.

8. The method of claim 7, wherein the negative of the K1 value is configured to indicate to the UE not to send the ACK/NACK feedback transmission.

9. The method of claim 7, wherein the negative of the K1 value is configured to indicate to the UE a time limit indication within which the UE is capable of sending the ACK/NACK feedback transmission.

10. The method of claim 1, wherein the predetermined event comprises a collision between PUCCH resources scheduled for transmission of the ACK/NACK feedback transmission and a time division duplex (TDD) scheduled downlink symbol, subslot, or slot.

11. The method of claim 10, further comprising:

determining an SPS configuration for the PUCCH resources; and determining when to cancel the ACK/NACK feedback transmission based on when the collision occurs and based on the determined SPS configuration.

12. The method of claim 1, further comprising:

receiving an indication of the predetermined event in a bit field of a downlink control information (DCI) scheduling the ACK/NACK feedback transmission or in radio resource control (RRC) signaling from the network entity.

13. The method of claim 1, wherein the predetermined event is applied for a group of SPS PDSCH configurations.

14. The method of claim 1, wherein the predetermined condition comprises one or more timer conditions defining respective timeout periods that are each measured from the time of reception of the PDSCH to a corresponding predefined time after reception of PDSCH for respective SPS configurations, and the one or more timer conditions are communicated in a bitmap within an activation or reactivation downlink control information (DCI) from the network entity.

15. The method of claim 14, wherein the one or more timer conditions include at least one of canceling the ACK/

NACK feedback transmission after expiration of the timer condition, not cancelling the ACK/NACK feedback transmission after expiration of the timer condition, or not canceling the ACK/NACK feedback transmission for a predetermined number of expirations of the timer condition and then canceling all further ACK/NACK feedback transmissions after the predetermined number of expirations has been exceeded.

16. A user equipment (UE) for wireless communication in a wireless communication network, comprising:

one or more memories; and one or more processors coupled to the one or more memories, wherein the one or more processors are configured to:

receive a physical downlink shared channel (PDSCH) transmission from a network entity; and determine when to transmit an acknowledgement (ACK) or negative acknowledgement (NACK) feedback transmission (ACK/NACK feedback transmission) to the network entity in response to the PDSCH transmission based on at least a predetermined condition configured by the network entity, the predetermined condition comprising the occurrence of a predetermined event; and cancel the ACK/NACK feedback transmission when the predetermined event occurs, wherein the predetermined event comprises a collision between physical uplink control channel (PUCCH) resources for a first semi persistent scheduling (SPS) PDSCH having a first priority and PUCCH resources for a second SPS PDSCH having a second priority lower than the first priority.

17. The UE of claim 16, wherein the predetermined condition comprises a timer condition defining a timeout period that is measured from the time of reception of the PDSCH to a predefined time after reception of the PDSCH, wherein the timeout period defines a time in which the UE is capable of sending the ACK/NACK feedback transmission to the network entity.

18. The UE of claim 17, wherein the one or more processors are further configured to cancel the ACK/NACK feedback transmission when the ACK/NACK feedback transmission is not sent during the timeout period.

19. The UE of claim 16, wherein the predetermined condition comprises a condition indicated in a portion of downlink control information (DCI) received from the network entity that activates either SPS or dynamic scheduling, wherein the portion of the DCI comprises a bit field where a particular bit value is configured to communicate to the UE to cancel the ACK/NACK feedback transmission for one or more particular SPS or dynamic scheduling configurations.

20. The UE of claim 16, wherein the predetermined condition comprises a condition indicated in a portion of downlink control information (DCI) received from the network entity that activates either SPS or dynamic scheduling;

wherein the portion of the DCI comprises a modified PUCCH grant time scheduling the ACK/NACK feedback transmission after receiving the PDSCH;

wherein the modified PUCCH grant time is configured to indicate either cancelling the ACK/NACK feedback transmission or to indicate a timeout period defining a time in which the UE is capable of sending the ACK/NACK feedback transmission to the network entity; and the one or more processors are further configured to:

receive the portion of the DCI from the network entity; and determine the modified PUCCH grant time from the portion of the DCI.

21. The UE of claim 16, wherein the predetermined condition comprises at least one of:

a first collision between PUCCH resources scheduled for transmission of the ACK/NACK feedback transmission and a time division duplex (TDD) scheduled downlink symbol, subslot, or slot.

22. The UE of claim 16, wherein the predetermined condition comprises one or more timer conditions defining respective timeout periods that are each measured from the time of reception of the PDSCH to a corresponding predefined time after reception of PDSCH for respective SPS configurations; and the one or more processors are configured to:

receive the one or more timer conditions in a bitmap within an activation or reactivation downlink control information (DCI) from the network entity.

23. A method for wireless communication by a network entity, comprising:

sending configuration information to a user equipment (UE) including a predetermined condition usable by the UE for determining whether to transmit an acknowledgement or negative acknowledgement feedback transmission (ACK/NACK feedback transmission) in response to physical downlink shared channel (PDSCH) transmissions during at least one of dynamic scheduling communications or semi persistent scheduling (SPS) communications;

sending a PDSCH transmission to the UE; and receiving the ACK/NACK feedback transmission from the UE responsive to the PDSCH when the UE determines to transmit the ACK/NACK feedback transmission based on the predetermined condition, the predetermined condition comprising the occurrence of a predetermined event, wherein the UE is configured to cancel the ACK/NACK feedback transmission when the predetermined event occurs, and the predetermined event comprises a collision between physical uplink control channel (PUCCH) resources for a first SPS PDSCH having a first priority and PUCCH resources for a second SPS PDSCH having a second priority lower than the first priority.

24. The method of claim 23, further comprising:

sending the configuration information to the UE in downlink control information (DCI) used for initiating at least one of dynamic scheduling communications or SPS communications by sending DCI to the UE.

25. The method of claim 23, wherein the configuration information comprises a timer condition defining a timeout period that is measured from the time of reception of the PDSCH to a predefined time after reception of the PDSCH, wherein the timeout period defines a time in which the UE is capable of sending the ACK/NACK feedback transmission to the network entity and after which the UE cancels the ACK/NACK feedback transmission.

26. A network entity for wireless communication in a wireless communication network, comprising:

one or more memories; and one or more processors coupled to the one or more memories, wherein the one or more processors are configured to:

send configuration information to a user equipment (UE) including a predetermined condition usable by the UE for determining whether to transmit an acknowledgement or negative acknowledgement feedback transmission (ACK/NACK feedback transmission) in response to physical downlink shared channel (PDSCH) transmissions during at least one of dynamic scheduling communications or semi persistent scheduling (SPS) communications;

send a PDSCH transmission to the UE; and receive the ACK/NACK feedback transmission from the UE responsive to the PDSCH when the UE determines to transmit the ACK/NACK feedback transmission based on the predetermined condition, the predetermined condition comprising the occurrence of a predetermined event, wherein the UE is configured to cancel the ACK/NACK feedback transmission when the predetermined event occurs, and the predetermined event comprises a collision between physical uplink control channel (PUCCH) resources for a first SPS PDSCH having a first priority and PUCCH resources for a second SPS PDSCH having a second priority lower than the first priority.

27. The network entity of claim 26, wherein the one or more processors are configured to:

send the configuration information to the UE in downlink control information (DCI) used for initiating at least one of dynamic scheduling communications or SPS communications by sending DCI to the UE.

28. The network entity of claim 26, wherein the configuration information comprises a timer condition defining a timeout period that is measured from the time of reception of the PDSCH to a predefined time after reception of the PDSCH, wherein the timeout period defines a time in which the UE is capable of sending the ACK/NACK feedback transmission to the network entity and after which the UE cancels the ACK/NACK feedback transmission.

* * * * *